US012793707B2

(12) United States Patent
Yu et al.

(10) Patent No.: US 12,793,707 B2
(45) Date of Patent: Nov. 10, 2026

(54) ARTIFICIAL INTELLIGENCE-BASED NATURAL LANGUAGE COMMAND CONTROL SYSTEM, METHOD AND SMART GLASSES

(71) Applicant: SOLOS TECHNOLOGY (SHENZHEN) LIMITED, Shenzhen (CN)

(72) Inventors: Chi Sum Yu, Shenzhen (CN); Chun Tung Chow, Shenzhen (CN); Kenneth Fan, Shenzhen (CN); Wai Kuen Cheung, Shenzhen (CN)

(73) Assignee: Solos Technology Limited, Shatin (HK)

( * ) Notice: Subject to any disclaimer, the term of this patent is extended or adjusted under 35 U.S.C. 154(b) by 260 days.

(21) Appl. No.: 18/242,043

(22) Filed: Sep. 5, 2023

(65) Prior Publication Data

US 2025/0022460 A1 Jan. 16, 2025

(30) Foreign Application Priority Data

Jul. 14, 2023 (CN) ......................... 202310875349.9

(51) Int. Cl.
*G06F 40/30* (2020.01)
*G10L 13/04* (2013.01)
(Continued)

(52) U.S. Cl.
CPC ............ *G10L 15/183* (2013.01); *G10L 13/04* (2013.01); *G10L 15/1815* (2013.01);
(Continued)

(58) Field of Classification Search
None
See application file for complete search history.

(56) References Cited

U.S. PATENT DOCUMENTS 9,922,642 B2 * 3/2018 Pitschel ................ G10L 15/063
9,984,686 B1 * 5/2018 Mutagi ................... G10L 17/22
(Continued)

FOREIGN PATENT DOCUMENTS

CN 115695620 A 2/2023

OTHER PUBLICATIONS

Written Opinion of PCT/CN2024/105358 dated Dec. 1, 2024. (Year: 2024).*

(Continued)

*Primary Examiner* — Richard Z Zhu
(74) *Attorney, Agent, or Firm* — Caldwell LLC

(57) ABSTRACT

Artificial intelligence-based natural language command control system, method and smart glasses are provided. The control system includes a smart glasses system and a model server configured with a GAILLM. The smart glasses system obtains a first user speech, performs a semantic parsing on the first user speech, generates at least one first prompt message based on the parsed semantics, and sends the at least one first prompt message to the model server. The model server obtains at least one task execution command through the GAILLM based on the at least one first prompt message, and sends the at least one task execution command to the smart glasses system. The smart glasses system executes at least one action corresponding to the at least one task execution command. The application improves the convenience of device control based on the smart glasses system, and the intelligence and interactivity of the smart glasses.

21 Claims, 10 Drawing Sheets

(51) Int. Cl.
*G10L 15/18* (2013.01)
*G10L 15/183* (2013.01)
*G10L 15/22* (2006.01)
*G10L 15/30* (2013.01)
*G06F 40/295* (2020.01)

(52) U.S. Cl.
CPC .......... *G10L 15/1822* (2013.01); *G10L 15/22* (2013.01); *G10L 15/30* (2013.01); *G06F 40/295* (2020.01); *G06F 40/30* (2020.01); *G10L 2015/223* (2013.01); *G10L 2015/225* (2013.01); *G10L 2015/228* (2013.01)

(56) References Cited

U.S. PATENT DOCUMENTS

| | | | | |
|---|---|---|---|---|
| 11,410,653 | B1 * | 8/2022 | Mahar | G10L 15/183 |
| 11,501,755 | B2 * | 11/2022 | Hwang | G06F 40/30 |
| 11,587,563 | B2 * | 2/2023 | Sheeder | G06F 3/167 |
| 2020/0279561 | A1 * | 9/2020 | Sheeder | G06F 3/011 |
| 2021/0304743 | A1 * | 9/2021 | Gross | H04M 1/72412 |
| 2021/0375279 | A1 * | 12/2021 | Lee | G10L 15/28 |
| 2021/0383794 | A1 * | 12/2021 | Kim | G06F 3/167 |
| 2022/0276882 | A1 * | 9/2022 | Bradfield | G06F 16/951 |
| 2022/0343909 | A1 * | 10/2022 | Lee | G06F 3/167 |
| 2022/0358920 | A1 * | 11/2022 | Lee | G06F 3/167 |
| 2024/0071376 | A1 * | 2/2024 | Kanungo | G10L 15/197 |
| 2024/0119930 | A1 * | 4/2024 | Jung | G06F 3/167 |
| 2024/0119932 | A1 * | 4/2024 | Khorshid | G06Q 50/01 |
| 2024/0143932 | A1 * | 5/2024 | Pandita | G06F 40/216 |
| 2024/0202284 | A1 * | 6/2024 | Aggarwal | G06N 5/022 |
| 2024/0203404 | A1 * | 6/2024 | Shabat | G06F 3/167 |
| 2024/0256840 | A1 * | 8/2024 | Song | G06N 3/0475 |
| 2024/0403772 | A1 * | 12/2024 | Lafreniere | G06F 3/011 |
| 2024/0419246 | A1 * | 12/2024 | Ullrich | G10L 13/08 |
| 2025/0005282 | A1 * | 1/2025 | Moriarty | G06F 16/345 |
| 2025/0104707 | A1 * | 3/2025 | Chae | H04R 9/08 |
| 2025/0356851 | A1 * | 11/2025 | Pandita | G10L 15/183 |

OTHER PUBLICATIONS

English translation of Written Opinion of PCT/CN2024/105358 dated Dec. 1, 2024. (Year: 2024).*

* cited by examiner

ARTIFICIAL INTELLIGENCE-BASED NATURAL LANGUAGE COMMAND CONTROL SYSTEM, METHOD AND SMART GLASSES

CROSS REFERENCE TO RELATED APPLICATIONS

This application claims priority to Chinese Patent Application No. 202310875349.9, filed Jul. 14, 2023, which is hereby incorporated by reference herein as if set forth in its entirety.

BACKGROUND

1. Technical Field

The present disclosure generally relates to the technical field of smart glasses, and in particular to an artificial intelligence-based natural language command control system, method and smart glasses.

2. Description of Related Art

With the development of computer technology, smart glasses are becoming more and more popular. However, the existing smart glasses are expensive, and in addition to their own functions as smart glasses, they usually only have the functions of listening to music and making or answering calls. Hence, the function of existing smart glasses is relatively simple, and the intelligence degree of existing smart glasses is lower.

SUMMARY

The embodiments of the present disclosure provide a natural language command control system, smart glasses for natural language commands, and a natural language command control method based on generative artificial intelligence large language models (GAILLM), which aim to improve the convenience of device control based on the smart glasses system, and the intelligence and interactivity of the smart glasses.

An embodiment of the present disclosure provides a natural language command control system based on GAILLM, including: a smart glasses system and a model server, and the model server is configured with the GAILLM.

The smart glasses system is configured to obtain a first user speech, perform a semantic parsing on the first user speech, generate at least one first prompt message based on the parsed semantics, and send the at least one first prompt message to the model server.

The model server is configured to obtain at least one task execution command through the GAILLM based on the at least one first prompt message from the smart glasses system, and send the at least one task execution command to the smart glasses system.

The smart glasses system is further configured to execute at least one action corresponding to the at least one task execution command.

An embodiment of the present disclosure further provides smart glasses for natural language commands based on GAILLM, including: a front frame, a temple, a microphone, a processor and a memory.

The temple is connected to the front frame, and the processor is electrically connected to the microphone and the memory, one or more computer programs executable on the processor are stored in the memory, and the one or more computer programs include instructions to: obtain a first user speech through the microphone; perform a semantic parsing on the first user speech; obtain, through the GAILLM, at least one task execution command based on the parsed semantics; and execute at least one action corresponding to the at least one task execution command.

An embodiment of the present disclosure further provides a natural language command control method based on GAILLM, applied to a smart wearable device system, including: obtaining a first user speech, performing a semantic parsing on the first user speech, and obtaining a parsing result; obtaining at least one task execution command through the GAILLM based on the parsing result; and executing at least one action corresponding to the at least one task execution command.

In each embodiment of the present application, the smart glasses system utilizes the GAILLM(s) to realize the device control based on the natural language voice command(s), thereby improving the convenience of the device control based on the smart glasses system, and due to the scalability and self-creativity of the GAILLM, the intelligence and interactivity of the smart glasses system are further improved.

BRIEF DESCRIPTION OF THE DRAWINGS

In order to more clearly illustrate the technical solutions in this embodiment, the drawings used in the embodiments or the description of the prior art will be briefly introduced below. It should be understood that, the drawings in the following description are only examples of the present disclosure. For those skilled in the art, other drawings can be obtained based on these drawings without creative works.

DETAILED DESCRIPTION

In order to make the objects, features and advantages of the present disclosure more obvious and easier to understand, the technical solutions in this embodiment will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

In the following descriptions, the terms "including", "comprising", "having" and their cognates that are used in the embodiments of the present disclosure are only intended to represent specific features, numbers, steps, operations, elements, components, or combinations of the foregoing items, and should not be understood as excluding the possibilities of the existence of one or more other features, numbers, steps, operations, elements, components or combinations of the foregoing items or adding one or more features, numbers, steps, operations, elements, components or combinations of the foregoing items.

In addition, in the present disclosure, the terms "first", "second", "third", and the like are only used for distinguishing, and cannot be understood as indicating or implying relative importance.

Unless otherwise defined, all terms (including technical and scientific terms) used herein have the same meanings as commonly understood by those skilled in the art to which the embodiments of the present disclosure belong. The terms (e.g., the terms those defined in commonly used dictionaries) will be interpreted as having the same meaning as the contextual meaning in the relevant technology and will not be interpreted as having idealized or overly formal meanings, unless clearly defined in the embodiments of the present disclosure.

Figure 1:
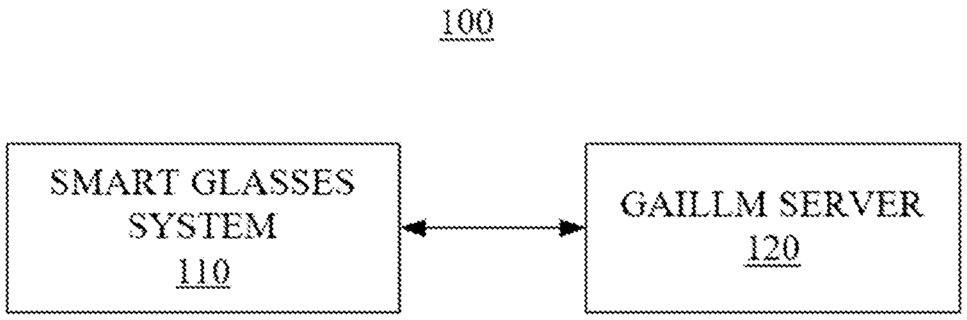
FIG. 1 is a schematic structural diagram of a natural language command control system based on Generative Artificial Intelligence Large Language Model (GAILLM) according to one embodiment of the present disclosure.

FIG. 1 is a schematic structural diagram of a natural language command control system based on Generative Artificial Intelligence Large Language Model (GAILLM) according to one embodiment of the present disclosure. As shown in FIG. 1, the control system 100 includes: a smart glasses system 110 and a model server 120.

The model server 120 may be a single server or a distributed server cluster composed of a plurality of servers, and one or more GAILLMs is configured on the model server 120 (for ease of understanding, hereinafter collectively referred to as for the GAILLM server).

Specifically, the smart glasses system 110 is used to obtain a first user speech, perform a semantic parsing on the first user speech, generate at least one first prompt message based on the parsed semantics, and send the at least one first prompt message to the model server 120.

The model server 120 is used to obtain at least one task execution command through the GAILLM(s) based on the at least one first prompt message sent by the smart glasses system 110, and send the at least one task execution command to the smart glasses system 110.

The smart glasses system 110 is further used to execute at least one action corresponding to the at least one task execution command.

The first user speech includes at least one user voice command. The smart glasses system 110 performs the semantic parsing on the first user speech through the NLP (Natural Language Processing), and generates at least one first prompt message according to the parsed semantics. The first prompt message includes the parsed semantics. Specifically, the smart glasses system 110 uses each semantics as a piece of prompt message, or uses a plurality of associated semantics as a piece of prompt message according to the relationship between each semantics.

In some embodiment, the GAILLM may be, for example but not limited to: ChatGPT of Open AI, Bard of Google, and other models with similar functions. The GAILLM is trained with a large number of semantics and corresponding task execution commands as samples. Optionally, the same task execution command may correspond to a plurality of similar semantics, and the same semantics may correspond to different task execution commands. The task execution command is used to instruct the target object to execute at least one target task. One target task is associated with at least one corresponding action. The task execution command includes description information of the target task. The description information of the target task is used to indicate the content of the target task, such as what actions need to be executed.

For example, assuming that the first user speech contains semantics of "I want to call Simon" or "I want to talk to Simon immediately", the GAILLM obtains the corresponding task execution command according to the semantics to instruct the smart glasses system 110 executes the action of calling Simon.

Further, the task execution command may include description information of the executor of each of the target tasks, such as a name, a type, or function(s) of the executor.

Figure 2:
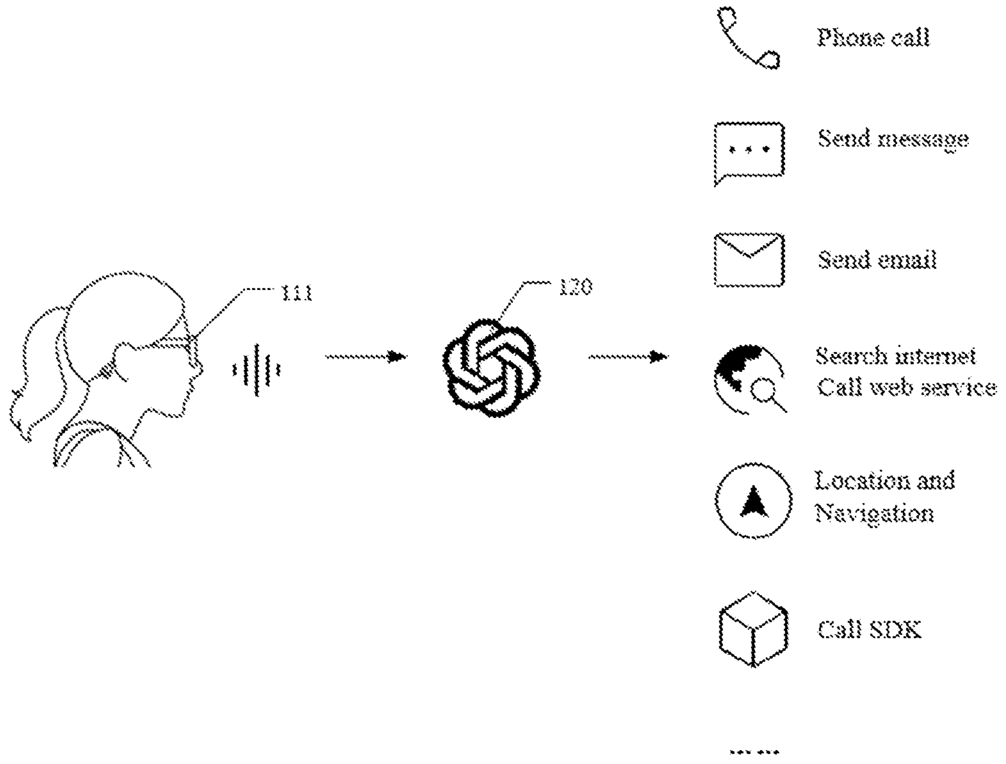
FIG. 2 is an application scenario of the control system shown in FIG. 1.

As shown in FIG. 2, in an actual application, the smart glasses system 110 includes smart glasses 111. A user can wear the smart glasses 111 and speak a first user speech. The smart glasses 111 obtain the first user speech through the built-in microphone, perform the semantic parsing on the first user speech, generate at least one first prompt message through a built-in prompt generator according to the parsed semantics, and send the at least one first prompt message to the GAILLM server 120 (for example, the parsed semantics may be sent to the GAILLM server 120 as the first prompt message), so that the GAILLM server 120 uses the GAILLM to obtain at least one task execution command according to the first prompt message. Each of task execution commands corresponds to at least one action, which may include, but is not limited to: making a phone call, sending a message, sending an email, searching the Internet, calling a network service, positioning (or location) and navigating, calling other third-party software development tools (Software Development Kit, SDK) to perform the tasks provided by the SDK, and controlling related devices in the Internet of Things (IoT), etc.

The prompt generator may be a software module, or a microcontroller configured with the software module. The prompt generator is used to generate the corresponding prompt message(s) (such as, the first prompt message(s) and the second prompt message(s) below) according to the parsed semantics in the user speech, and the parsed semantics is obtained by parsing each of user speeches.

Optionally, in some embodiments of the present disclosure, the prompt generator is further configured on the GAILLM server 120, the smart glasses 111 send the parsed semantics to the GAILLM server 120. The GAILLM server 120 generates at least one first prompt message based on the parsed semantics using the prompt generator, and then inputs the at least one first prompt message into the GAILLM.

Figure 3:
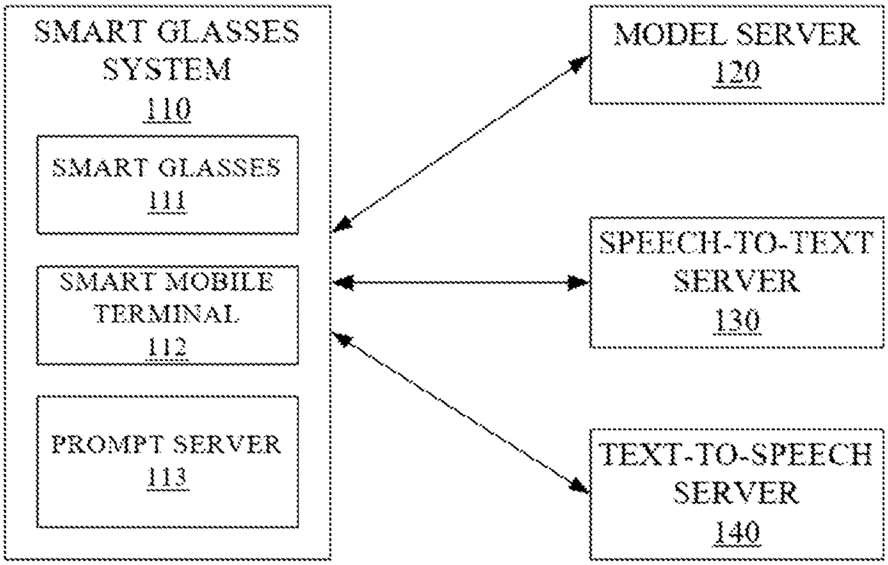
FIG. 3 is a schematic structural diagram of a natural language command control system based on the GAILLM according to another embodiment of the present disclosure.

FIG. 3 is a schematic structural diagram of a natural language command control system based on the GAILLM according to another embodiment of the present disclosure. Optionally, in another embodiment of the present disclosure, as shown in FIG. 3, the smart glasses system 110 includes: smart glasses 111 and a smart mobile terminal 112. Further, a corresponding application program (APP) is installed in the smart glasses 111 or the smart mobile terminal 112, and the smart glasses 111 and the smart mobile terminal 112 establish a data connection through Bluetooth, and use the APP for data interaction.

The smart glasses 111 may be open smart glasses, and the specific structure of the smart glasses 111 may refer to related descriptions in the following embodiments shown in FIG. 12 and FIG. 13.

The smart mobile terminal 112 may include, but is not limited to: a cellular phone, a smart phone, other wireless communication devices, a personal digital assistant, an audio player, other media players, a music recorder, a video recorder, camera, other media recorders, a smart radio, a Laptop computer, a personal digital assistant (PDA), a portable multimedia player (PMP), a Moving Picture Experts Group (MPEG-1 or MPEG-2) audio layer 3 (MP3) player, a digital camera, and a smart wearable device (such as smart watch, smart bracelet, etc.). An Android or iOS or other operating systems are further installed on the smart mobile terminal 112.

Specifically, the smart glasses 111 are used to: obtain the first user speech through a built-in microphone, and send the first user speech to the smart mobile terminal 112 through the Bluetooth.

The smart mobile terminal 112 is used to: convert the first user speech into a first text through a speech-to-text engine, perform the semantic parsing on the first text, generate the at least one first prompt message based on the parsed semantics, and send the at least one first prompt message to the model server 120. The speech-to-text engine is configured on the smart mobile terminal 112 or a server in the cloud, such as a speech-to-text server, a prompt server, or the GAILLM server 120. The smart mobile terminal 112 converts the first user speech into the corresponding first text by sending the first user speech to a server configured with the speech-to-text engine. The prompt generator may be configured on the smart mobile terminal 112, and is used to generate the first prompt message based on the parsed semantics.

The GAILLM server 120 is further used to: obtain the at least one task execution command through the GAILLM based on the at least one first prompt message sent by the smart mobile terminal 112, and send the at least one task execution command to the smart mobile terminal 112.

The smart mobile terminal 112 is further used to execute the at least one action corresponding to the at least one task execution command.

Optionally, in other embodiments of the present disclosure, the smart mobile terminal 112 is further used to: generate a plurality of the first prompt messages according to the parsed semantics, and send the plurality of the first prompt messages together with the appearance order of semantics corresponding to each of the first prompt messages in the first text to the GAILLM server 120.

The GAILLM server 120 is further used to: obtain a plurality of task execution commands through the GAILLM based on the plurality of the first prompt messages and the appearance order sent by the smart mobile terminal 112, and send the plurality of task execution commands and execution order of each of the task execution commands to the smart mobile terminal 112. The execution order corresponds to the appearance order.

The smart mobile terminal 112 is further used to execute actions corresponding to each of the task execution commands according to the execution order.

Optionally, in other embodiments of the present disclosure, the smart mobile terminal 112 is further used to: generate a plurality of the first prompt messages based on the parsed semantics, and send the plurality of the first prompt messages to the GAILLM server 120 one by one according to the appearance order of semantics corresponding to each of the first prompt messages in the first text.

Specifically, after one of the first prompt messages is sent by the smart mobile terminal 112, the smart mobile terminal 112 sends the next one of the first prompt messages to the GAILLM server 120 when the smart mobile terminal 112 receives at least one task execution command corresponding to the sent prompt messages sent by the GAILLM server 120. Alternatively, after one of the first prompt messages is sent by the smart mobile terminal 112, the smart mobile terminal 112 receives the at least one task execution command corresponding to the sent prompt messages from the GAILLM server 120, executes the corresponding at least one task execution command, and then sends the next one of the first prompt messages to the GAILLM server 120.

Optionally, in other embodiments of the present disclosure, on the basis of the above-mentioned embodiments, the GAILLM server 120 is further used to:

- determine, through the GAILLM, whether there is information needs to be supplemented or confirmed based on the at least one first prompt message;
- when there is no the information needs to be supplemented or confirmed, obtain, through the GAILLM, the at least one task execution command based on the at least one first prompt message;
- when there is the information needs to be supplemented or confirmed, generate, through the GAILLM, a text including prompt information of the information needs to be supplemented or confirmed, and send the text to the smart mobile terminal 112;
- receive a second prompt message from the smart mobile terminal 112, and determine, through the GAILLM, whether there is the information needs to be supplemented or confirmed based on all received prompt messages;
- when there is no the information needs to be supplemented or confirmed, obtain, through the GAILLM, the at least one task execution command based on all received prompt messages; and
- when there is the information needs to be supplemented or confirmed, return to the step of generating, through the GAILLM, the text including the prompt information of the information needs to be supplemented or confirmed, and sending the text to the smart mobile terminal 112.

The smart mobile terminal 112 is further used to: convert the text into a speech through a text-to-speech engine, and send the speech to the smart glasses 111. The text-to-speech engine is configured on the smart mobile terminal 112, or is configured on a cloud server, such as a text-to-speech server, a prompt server, or the GAILLM server 120. The smart mobile terminal 112 converts the text into the corresponding speech by sending the text to a server configured with the text-to-speech engine.

The smart glasses 111 are further used to: receive the speech through the Bluetooth, play the speech through a built-in speaker of the smart glasses 111, obtain a second user speech through the microphone, and send the second user speech to the smart mobile terminal 112 through the Bluetooth.

The smart mobile terminal 112 is further used to: convert the second user speech into a second text using the speech-to-text engine, perform a semantic parsing on the second text, generate the second prompt message(s) based on the parsed semantics in the second text, and send the second prompt message to the GAILLM server 120.

Alternatively, when there is the information that needs to be supplemented or confirmed, a response generated by the GAILLM may include: at least one task execution command and the text containing the prompt information of the information that needs to be supplemented or confirmed, so as to ask the user more information or acknowledgment to the user while executing the action(s) corresponding to the at least one task execution command, and then more task execution commands are obtained according to the user's reply, thereby the flexibility and intelligence of the task execution are further improved.

For example, assuming that the first user speech is to reserve the first meeting room at 3 p.m., the first task execution command and a text containing the prompt message of "who are the participants? do you need to notify them?" are obtained through the GAILLM. The smart mobile terminal 112 converts the text into a speech and sends the speech to the smart glasses 111 for playing. At the same time, the smart mobile terminal 112 executes the action of reserving the first conference room at 3:00 p.m. from the conference management server in the cloud according to the first task execution command.

After the speech is played, the smart glasses 111 obtain the second user speech and send the second user speech to the smart mobile terminal 112, such as: "call Peter and Simon to inform them that they will have a meeting in the first conference room at 3:00 p.m.". The smart mobile terminal 112 converts the second user speech into a second text, performs the semantic parsing on the second text, generates a corresponding prompt message according to the parsed semantics, and sends the corresponding prompt message to the GAILLM. The GAILLM generates the second task execution command according to the corresponding prompt message, so that the smart mobile terminal 112 performs the following actions according to the second task execution command: obtaining the phone numbers of Peter and Simon, generating a notification speech such as "at 3 p.m. there is a meeting in the first conference room, please attend on time", and calling Peter and Simon using the phone numbers and playing the notification speech.

Optionally, in other embodiments of the present disclosure, as shown in FIG. 3, the smart glasses system 110 includes smart glasses 111 and a prompt server 113, and the control system 100 further includes a speech-to-text server 130 and a text-to-speech server 140.

The smart glasses 111 are used to obtain the first user speech through a built-in microphone of the smart glasses 111, and send the first user speech to the prompt server 113.

The prompt server 113 is used to send the first user speech to the speech-to-text server 130.

The speech-to-text server 130 is used to convert the first user speech into a first text, and send the first text to the prompt server 113.

The prompt server 113 is further used to perform the semantic parsing on the first text, generate the at least one first prompt message based on the parsed semantics, and send the at least one first prompt message to the GAILLM server 120. A prompt generator may be configured on the prompt server 113 to generate the at least one first prompt message based on the parsed semantics.

The GAILLM server 120 is further used to: determine whether there is information needs to be supplemented or confirmed through the GAILLM based on the at least one first prompt message; when there is no the information needs to be supplemented or confirmed, obtain the at least one task execution command through the GAILLM based on the at least one first prompt message, and send the at least one task execution command to the prompt server 113; and when there is the information needs to be supplemented or confirmed, obtain the at least one task execution command through the GAILLM based on the at least one first prompt message, and send the at least one task execution command and prompt information of the information needs to be supplemented or confirmed to the prompt server 113.

The prompt server 113 is further used to send one or more control instructions to at least one device in an Internet of Things (IoT) according to the at least one task execution command to control the at least one device to execute one or more actions specified by the at least one task execution command, generate a corresponding text according to the prompt information, and send the corresponding text to the text-to-speech server 140.

The text-to-speech server 140 is used to convert the corresponding text into a speech, and send the speech to the prompt server 113.

The prompt server 113 is further used to send the speech to the smart glasses 111.

The smart glasses are further used to play the speech through a built-in speaker.

Optionally, as shown in FIG. 3, in other embodiments of the present disclosure, the smart glasses system 110 includes smart glasses 111, a smart mobile terminal 112 and a prompt server 113, and the control system 100 further includes a speech-to-text server 130 and a text-to-speech server 140.

The smart glasses 111 are used to obtain the first user speech by a built-in microphone of the smart glasses 111, and send the first user speech to the smart mobile terminal 112.

The smart mobile terminal 112 is used to send the first user speech to the speech-to-text server 130.

The speech-to-text server 130 is used to convert the first user speech into a first text and send the first text to the smart mobile terminal 112.

The smart mobile terminal 112 is further used to send the first text to the prompt server 113.

The prompt server 113 is used to perform the semantic parsing on the first text, generate the at least one first prompt message according to the parsed semantics, and send the at least one first prompt message to the GAILLM server 120.

The GAILLM server 120 is further used to: determine whether there is information needs to be supplemented or confirmed through the GAILLM based on the at least one first prompt message; when there is no the information needs to be supplemented or confirmed, obtain the at least one task execution command through the GAILLM based on the at least one first prompt message, and send the at least one task execution command to the prompt server 113; and when there is the information needs to be supplemented or confirmed, obtain the at least one task execution command through the GAILLM based on the at least one first prompt message, and send the at least one task execution command and prompt information of the information needs to be supplemented or confirmed to the prompt server 113.

The prompt server 113 is further used to send one or more control instructions to at least one device in the IoT according to the at least one task execution command to control the at least one device to execute one or more actions specified by the at least one task execution command, generate a corresponding text according to the prompt information, and send the corresponding text to the smart mobile terminal 112.

The smart mobile terminal 112 is further used to send the corresponding text to the text-to-speech server 140.

The text-to-speech server 140 is used to convert the corresponding text into a speech and send the speech to the smart mobile terminal 112.

The smart mobile terminal 112 is further used to send the speech to the smart glasses 111.

The smart glasses 111 are further used to play the speech through the built-in speaker of the smart glasses 111.

Optionally, in other embodiments of the present disclosure, as shown in FIG. 3, the smart glasses system 110 includes smart glasses 111, a smart mobile terminal 112 and a prompt server 113.

The smart glasses 111 are used to obtain the first user speech through the built-in microphone, and send the first user speech to the smart mobile terminal 112.

The smart mobile terminal 112 is used to convert the first user speech into a first text and send the first text to the prompt server 113.

The prompt server 113 is further used to perform the semantic parsing on the first text, generate the at least one first prompt message based on the parsed semantics, and send the at least one first prompt message to the GAILLM server 120.

The GAILLM server 120 is further used to: determine whether there is information needs to be supplemented or confirmed through the GAILLM based on the at least one first prompt message; when there is no the information needs to be supplemented or confirmed, obtain the at least one task execution command through the GAILLM based on the at least one first prompt message, and send the at least one task execution command to the prompt server 113; and when there is the information needs to be supplemented or confirmed, obtain the at least one task execution command through the GAILLM based on the at least one first prompt message, and send the at least one task execution command and prompt information of the information needs to be supplemented or confirmed to the prompt server 113.

The prompt server 113 is further used to send one or more control instructions to at least one device in the IoT according to the at least one task execution command to control the at least one device to execute one or more actions specified by the at least one task execution command, and generate a corresponding text according to the prompt information and send the corresponding text to the smart mobile terminal 112.

The smart mobile terminal 112 is further used to convert the corresponding text into a speech, and send the speech to the smart glasses 111.

The smart glasses 111 are further used to play the speech through the built-in speaker.

Optionally, in other embodiments of the present disclosure, the smart glasses system 110 includes smart glasses 111 and a smart mobile terminal 112, and the control system 100 further includes a prompt server. The prompt server is configured with a speech-to-text engine, and the smart mobile terminal 112 is configured with a text-to-speech engine.

The smart glasses 111 are used to obtain the first user speech through a built-in microphone, and send the first user speech to the prompt server through a wireless network.

The prompt server is used to convert the first user speech into a first text through the speech-to-text engine and perform the semantic parsing on the first text, generate the at least one first prompt message according to the parsed semantics, and send the at least one first prompt message to the smart mobile terminal 112. The smart glasses 111 further send the identification information of the smart mobile terminal 112 to the prompt server while sending the first user speech, so that the prompt server sends the at least one first prompt message to the mobile terminal 112 according to the identification information. Alternatively, the prompt server pre-stores the associated information between the smart glasses 111 and the smart mobile terminal 112. While sending the first user speech, the smart glasses 111 further send the identity information of the smart glasses 111 to the prompt server, so that the prompt server sends the at least one first prompt message to the smart mobile terminal 112 according to the identity information and the associated information. Alternatively, the prompt server sends the at least one first prompt message to the smart glasses 111, so as to forward the at least one first prompt message to the smart mobile terminal 112 through the smart glasses 111.

The smart mobile terminal 112 is used to send the at least one first prompt message to the GAILLM server 120.

The GAILLM server 120 is further used to: determine whether there is information needs to be supplemented or confirmed through the GAILLM based on the at least one first prompt message; when there is no the information needs to be supplemented or confirmed, obtain the at least one task execution command through the GAILLM based on the at least one first prompt message, and send the at least one task execution command to the smart mobile terminal 112; and when there is the information needs to be supplemented or confirmed, obtain the at least one task execution command through the GAILLM based on the at least one first prompt message, and send prompt information of the information needs to be supplemented or confirmed and the at least one task execution command to the smart mobile terminal 112. The prompt information of the information needs to be supplemented or confirmed is generated by the GAILLM server 120 according to the determined information that needs to be supplemented or confirmed, and is used to indicate or prompt what information needs to be supplemented or confirmed.

The smart mobile terminal 112 is further used to execute at least one action corresponding to the at least one task execution command.

The smart mobile terminal 112 is further used to generate a corresponding text according to the prompt information, convert the corresponding text into a speech through the text-to-speech engine, and send the speech to the smart glasses 111. For example, the prompt information may be "confirm which Peter in the contact list needs to be called", and the corresponding text may be "which Peter do you want to call, Peter (1), phone number 12345, Peter (2), Phone number 23456, Peter (3), phone number 34567".

The smart glasses 111 are further used to play the speech through the built-in speaker.

Optionally, in other embodiments of the present disclosure, the smart glasses system 110 includes: smart glasses 111 and a smart mobile terminal 112, and the smart mobile terminal 112 is configured with the GAILLM.

The smart glasses 111 are used to obtain the first user speech through the built-in microphone, and send the first user speech to the smart mobile terminal 112 through the Bluetooth.

The smart mobile terminal 112 is used to convert the first user speech into a first text through a speech-to-text engine and perform the semantic parsing on the first text, obtain the at least one task execution command through the GAILLM configured on the smart mobile terminal 112 based on the parsed semantics, and execute the at least one action corresponding to the at least one task execution command. The speech-to-text engine is configured on the smart mobile terminal 112 or the speech-to-text server 130. The smart mobile terminal 112 sends the first user speech to the speech-to-text server 130 to convert the first user speech into the first text by the speech-to-text server 130, or to convert the first user speech into the first text and perform the semantic parsing on the first text by the speech-to-text server 130.

The smart mobile terminal 112 is further used to: determine whether there is information needs to be supplemented or confirmed through the GAILLM based on the parsed semantics; when there is no the information needs to be supplemented or confirmed, obtain the at least one task execution command through the GAILLM based on the parsed semantics; and when there is the information needs to be supplemented or confirmed, generate a text including prompt information of the information needs to be supplemented or confirmed through the GAILLM, convert the text into a speech through a text-to-speech engine, and send the speech to the smart glasses 111.

The smart glasses 111 are further used to receive the speech through the Bluetooth, and play the speech through the built-in speaker, obtain the second user speech through the microphone, and send the second user speech to the smart mobile terminal 112 through the Bluetooth.

The smart mobile terminal 112 is further used to convert the second user speech into a second text through the speech-to-text engine, perform a semantic parsing on the second text, and determine, through the GAILLM, whether there is the information needs to be supplemented or confirmed based on the parsed semantics in the second text (or based on all parsed semantics, such as the semantics in the first text and the semantics in the second text), when there is no the information needs to be supplemented or confirmed, obtain, through the GAILLM, the at least one task execution command based on all parsed semantics; and when there is the information needs to be supplemented or confirmed, return to the step of generating the text including the prompt information of the information needs to be supplemented or confirmed through the GAILLM.

The smart mobile terminal 112 is further used to determine whether the smart mobile terminal 112 is configured with the GAILLM according to the installation log or the preset mark when the first user speech is received by the smart mobile terminal 112. When the smart mobile terminal 112 is configured with the GAILLM, the parsed semantics is inputted into the GAILLM on the smart mobile terminal 112, so as to obtain the at least one task execution command through the GAILLM on the smart mobile terminal 112. Otherwise, the at least one first prompt message is generated based on the parsed semantics by the smart mobile terminal 112, and the generated at least one first prompt message is sent to the GAILLM server 120.

Optionally, in other embodiments of the present disclosure, the GAILLM is further configured on the smart glasses 111. The smart glasses 111 are further used to: obtain the first user speech, perform the semantic parsing on the first user speech to obtain parsed semantics, input the parsed semantics into the GAILLM to obtain the at least one task execution command through the GAILLM, and execute the at least one action corresponding to the at least one task execution command. Specifically, the smart glasses 111 may utilize a local speech-to-text engine, or through the speech-to-text server 130, convert the first user speech into the corresponding first text, and perform the semantic parsing on the first text. The smart glasses 111 may be configured with a prompt generator for generating the at least one first prompt message based on the parsed semantics, and the smart glasses 111 input the at least one first prompt message into the GAILLM to generate the at least one task execution command through the GAILLM.

The smart glasses 111 are further used to: determine whether the GAILLM is installed on the smart glasses 111 according to the installation log; when the GAILLM is installed on the smart glasses 111, input the parsed semantics into the GAILLM to generate the at least one task execution command through the GAILLM; and when the GAILLM is not installed on the smart glasses 111, generate the at least one first prompt message according to the parsed semantics, send the at least one first prompt message to the GAILLM server 120 or the smart mobile terminal 112, to obtain the at least one task execution command through the GAILLM configured on the GAILLM server 120 or the smart mobile terminal 112.

Alternatively, the smart glasses 111 are further used to: determine the installation location of the GAILLM according to the pre-stored model configuration information; when the GAILLM is installed locally on the smart glasses 111, input the parsed semantics into the GAILLM to generate the at least one task execution command through the GAILLM; when the GAILLM is installed on the GAILLM server 120, generate the at least one first prompt message based on the parsed semantics, and send the at least one first prompt message to the GAILLM server 120, or forward the at least one first prompt message to the GAILLM server 120 through the smart mobile terminal 112, so as to obtain the at least one task execution command through the GAILLM on the GAILLM server 120; and when the GAILLM is installed on the smart mobile terminal 112, generate the at least one first prompt message based on the parsed semantics, and send the first prompt message to the smart mobile terminal 112, to obtain the at least one task execution command through the GAILLM on smart mobile terminal 112.

Further, in other embodiments of the present disclosure, the smart glasses 111, the smart mobile terminal 112, or the prompt server 113 are further used to: after the at least one task execution command is received, determine one or more executors of one or more target tasks according to description information of target task or executor description information of target task in the task execution command, and distribute each task execution command to the corresponding executor(s), so that each executor executes at least one action associated with the corresponding task execution command.

Figure 4:
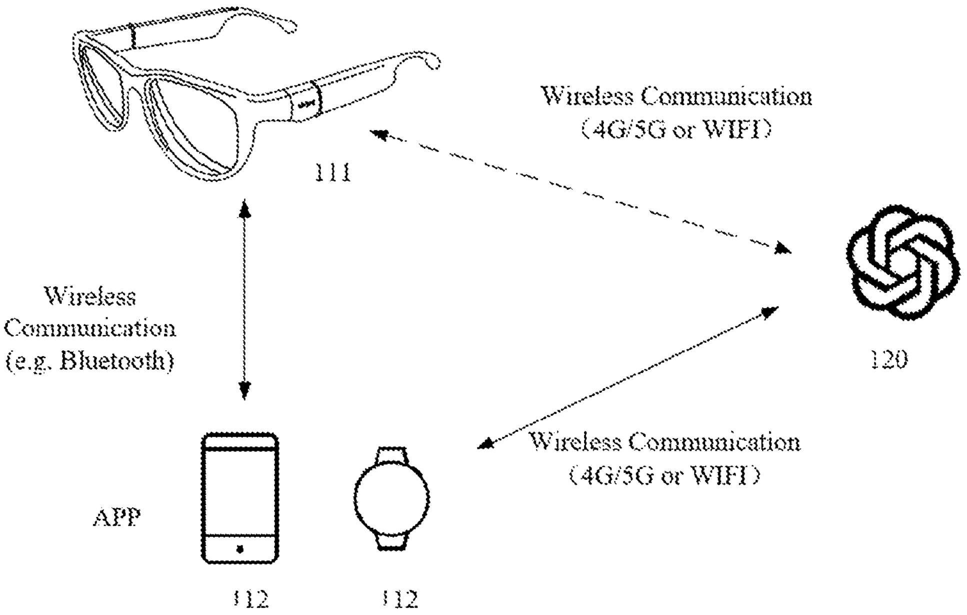
FIG. 4 is a schematic diagram of the first system framework based on the control system shown in FIGS. 1 and 3.

FIG. 4 is a schematic diagram of the first system framework based on the control system shown in FIGS. 1 and 3. As shown in FIG. 4, the control system includes: smart glasses 111, a smart mobile terminal 112 (such as a smart phone or a smart watch) and a GAILLM server 120. The GAILLM is configured on the GAILLM server 120. An application program (APP) is installed on the smart mobile terminal 112, and the APP is used for wireless communication with the smart glasses 111 via the Bluetooth. Alternatively, the smart glasses 111 communicate wirelessly with the GAILLM server 120 through, for example, a 4G or 5G cellular network or WIFI. The smart mobile terminal 112 communicates wirelessly with the GAILLM server 120 through, for example, a 4G or 5G cellular network or WIFI.

The smart glasses 111 obtain the first user speech and send the first user speech to the smart mobile terminal 112. The smart mobile terminal 112 converts the first user speech into a first text through a speech-to-text engine and performs the semantic parsing on the first text, generates the at least one first prompt message based on the parsed semantics, and sends the at least one first prompt message to the GAILLM server 120. The GAILLM server 120 obtains the at least one task execution command through the GAILLM based on the at least one first prompt message, and sends the at least one task execution command to the smart mobile terminal 112. The smart mobile terminal 112 executes the at least one action corresponding to the at least one task execution command.

Figure 5:
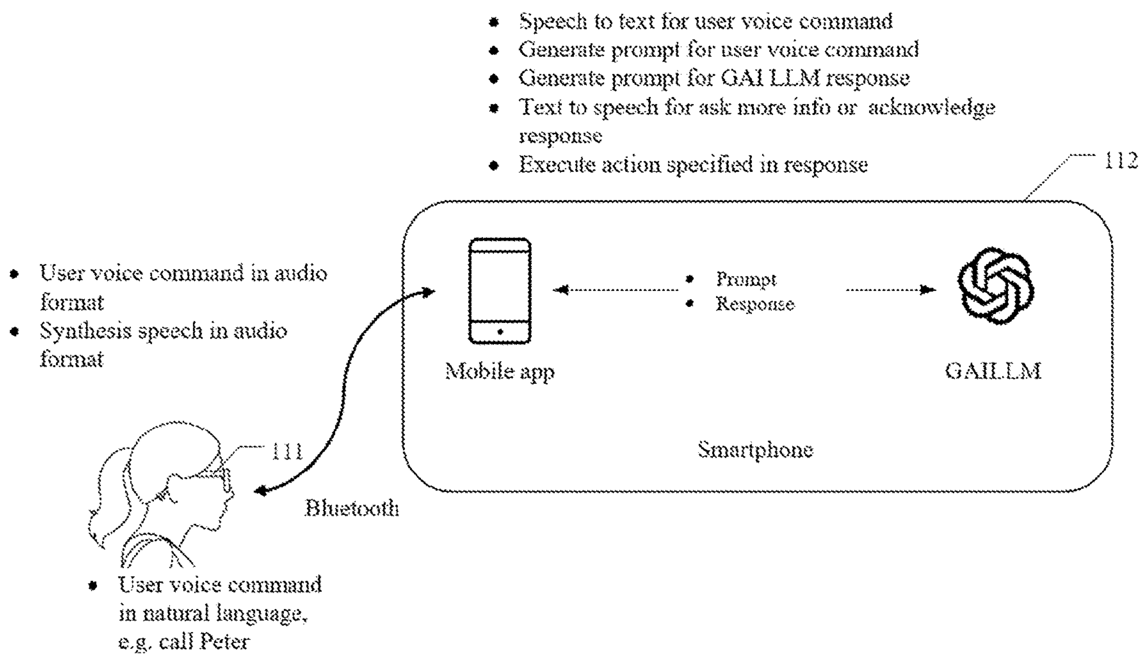
FIG. 5 is a schematic diagram of the second system framework based on the control system shown in FIGS. 1 and 3.

FIG. 5 is a schematic diagram of the second system framework based on the control system shown in FIGS. 1 and 3. As shown in FIG. 5, the control system includes: smart glasses 111 and a smartphone 112. The GAILLM is embedded in the smartphone 112. The smartphone 112 is further installed with a mobile APP for wireless communication with the smart glasses 111 via the Bluetooth.

A user speech in natural language (i.e., user voice command in audio format shown in FIG. 5), for example, "Call Peter", is sent from the smart glasses 111 to the mobile APP on the smartphone 112 via the Bluetooth. The mobile APP converts the user speech into a text through a speech-to-text engine and performs the semantic parsing on the text, and generates the first prompt message according to the parsed semantics, which is used to inquire the GAILLM about an intention of the user voice command. Then, this first prompt message is inputted into the GAILLM to obtain a response outputted by GAILLM. The response indicates that the intention is "phone call" and includes the first task execution command. According to the first task execution command, the mobile APP executes the actions of: obtaining Peter's phone number in the smartphone contact list, and sending an execution result to the GAILLM. The execution result may include, for example, all recorded phone numbers in the contact list associated with Peter.

According to the execution result, when there is only one Peter in the contact list, the GAILLM outputs the second task execution command, so that the mobile APP makes a call according to Peter's phone number in the contact list.

When there is no Peter in the contact list, the GAILLM outputs a response including prompt information and the third task execution command, where the prompt information is used to prompt the mobile APP to ask the user about Peter's phone number, so that the mobile APP generates a text containing the prompt information, such as "please enter Peter's phone number", converts the text into a synthesis speech in audio format through the text-to-speech engine, and sends the synthesis speech to the smart glasses 111 for playback, and then the mobile APP analyzes the user speech obtained by the smart glasses 111 to obtain a phone number spoken by the user, and according to the third task execution command, makes a call based on the phone number spoken by the user.

When there are a plurality of Peter on the contact list such as Peter Zhang, Peter Wang, and Peter Lee, the GAILLM outputs a response including prompt information used to prompt the mobile APP to confirm which Peter the user needs to call, so that the mobile APP generates a text containing the prompt information, converts the text into a synthesis speech in audio format through the text-to-speech engine, and sends the synthesis speech to the smart glasses 111 for playback. After the synthesis speech is played, the smart glasses 111 obtain the second user speech (for example: "Peter Lee") and send the second user speech to the mobile APP. The mobile APP converts the second user speech into a text through the speech-to-text engine and performs the semantic parsing on the converted text, generates the second prompt message according to the parsed semantics, and inputs the second prompt message into the GAILLM. According to the second prompt message, the GAILLM determines the phone number of Peter Lee to be called and outputs the fourth task instruction command, so that the mobile APP makes a call based on the determined phone number according to the fourth task execution command.

Figure 6:
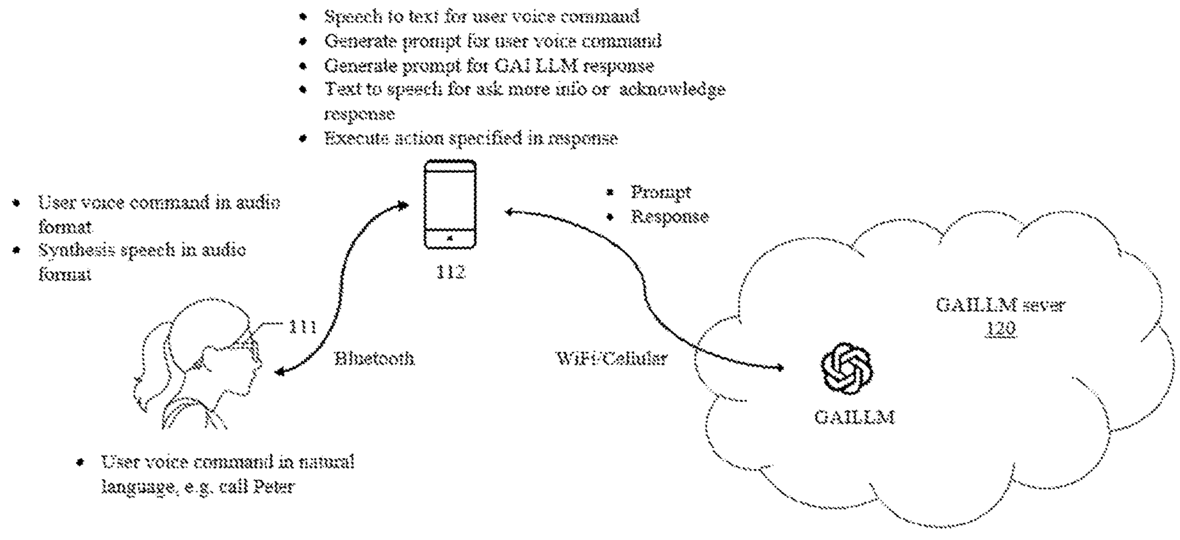
FIG. 6 is a schematic diagram of the third system framework based on the control system shown in FIGS. 1 and 3.

FIG. 6 is a schematic diagram of the third system framework based on the control system shown in FIGS. 1 and 3. As shown in FIG. 6, the control system includes: smart glasses 111, a smartphone 112 and a GAILLM server 120. The GAILLM is configured on the GAILLM server 120. The smartphone 112 is further installed with a mobile APP for wireless communication with the smart glasses 111 via the Bluetooth. The mobile APP further communicates wirelessly with the GAILLM server 120 via WIFI or cellular network.

A user speech in natural language (i.e., user voice command in audio format shown in FIG. 6), for example, "Call Peter", is sent from the smart glasses 111 to the mobile APP on the smartphone 112 via the Bluetooth. The mobile APP converts the user speech into a text through the speech-to-text engine, performs the semantic parsing on the text, generates prompt message according to the parsed semantics, and then sends the prompt message to the GAILLM server 120. The GAILLM server 120 inputs the prompt message into the GAILLM to obtain a response outputted by the GAILLM, and sends the response to the mobile APP on the smartphone 112. The response includes a task execution command, and prompt information of the information needs to be supplemented or confirmed. The mobile APP generates a text for the response, and the text includes the prompt information of the information needs to be supplemented or confirmed. The mobile APP converts the text into a synthesis speech in audio format through a text-to-speech engine, and sends the synthesis speech to the smart glasses 111 for playback, so as to ask the user more information or acknowledgment to the user. At the same time, the mobile APP executes at least one action specified by the task execution command in the response.

Figure 7:
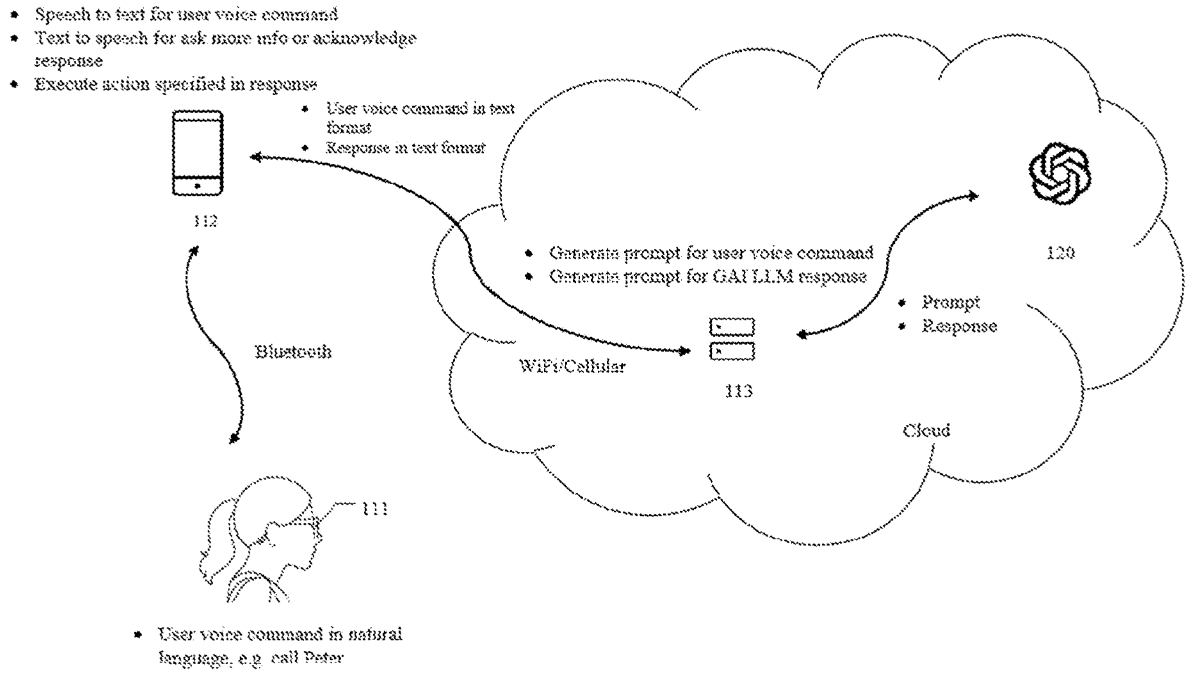
FIG. 7 is a schematic diagram of the fourth system framework based on the control system shown in FIGS. 1 and 3.

FIG. 7 is a schematic diagram of the fourth system framework based on the control system shown in FIGS. 1 and 3. As shown in FIG. 7, the control system includes: smart glasses 111, a smartphone 112, and a prompt server 113 and a GAILLM server 120 in the cloud. The GAILLM is configured on the GAILLM server 120. The smartphone 112 is further installed with a mobile APP for wireless communication with the smart glasses 111 via the Bluetooth. The mobile APP further communicates wirelessly with the prompt server 113 through WIFI or cellular network.

A user speech in natural language (i.e., user voice command in audio format shown in FIG. 7), for example, "Call Peter", is sent from the smart glasses 111 to the mobile APP on the smartphone 112 via the Bluetooth. The mobile APP converts the user speech into the first text through the speech-to-text engine and sends the first text (that is, the voice command in text format shown in FIG. 7) to the prompt server 113. The prompt server 113 performs the semantic parsing on the first text, generates prompt message according to the parsed semantics, and then sends the prompt message to the GAILLM server 120. The GAILLM server 120 inputs the prompt message into the GAILLM to obtain a response outputted by the GAILLM, and sends the response to the prompt server 113. The response includes a task execution command, and prompt information of the information needs to be supplemented or confirmed. The prompt server 113 generates the second text (i.e., the response in text format shown in FIG. 7) for the response, and the second text includes the task execution command and the prompt information of the information needs to be supplemented or confirmed. The prompt server 113 sends the second text to the mobile APP. The mobile APP converts the prompt information in the second text into a synthesis speech in audio format through a text-to-speech engine, and sends the synthesis speech to the smart glasses 111 for playback, so as to ask the user more information or acknowledgment to the user. At the same time, the mobile APP executes at least one action specified by the task execution command in the response.

Figure 8:
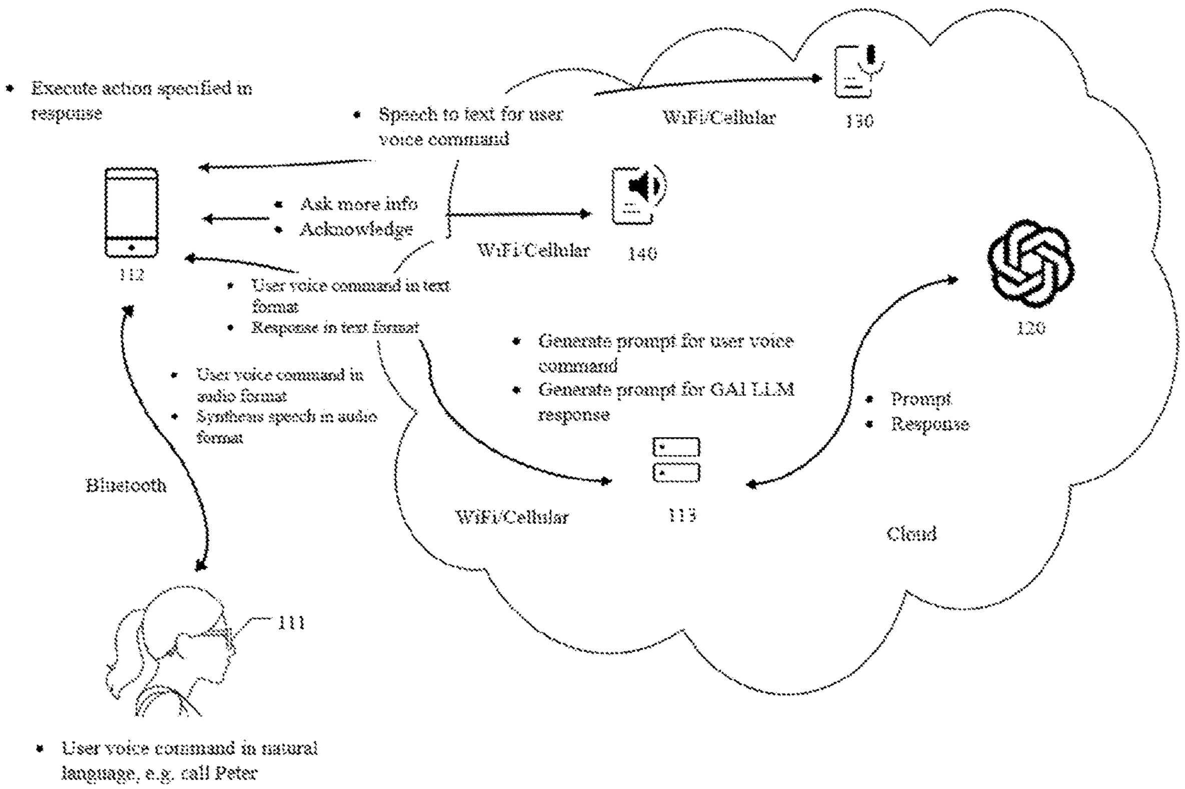
FIG. 8 is a schematic diagram of the fifth system framework based on the control system shown in FIGS. 1 and 3.

FIG. 8 is a schematic diagram of the fifth system framework based on the control system shown in FIGS. 1 and 3. As shown in FIG. 8, the control system includes: smart glasses 111, a smartphone 112, and a prompt server 113, a GAILLM server 120, a speech-to-text server 130 and a text-to-speech server 140 in the cloud. The GAILLM is configured on the GAILLM server 120. The smartphone 112 is installed with a mobile APP for wireless communication with the smart glasses 111 via the Bluetooth. The mobile APP further communicates wirelessly with the prompt server 113, the speech-to-text server 130 and the text-to-speech server 140 via WIFI or cellular network.

A user speech in natural language (i.e., user voice command in audio format shown in FIG. 8), for example, "Call Peter", is sent from the smart glasses 111 to the mobile APP on the smartphone 112 via the Bluetooth. The mobile APP converts the user speech into the first text through the speech-to-text server 130, and sends the first text (i.e., the voice command in text format shown in FIG. 8) to the prompt server 113. The prompt server 113 performs the semantic parsing on the first text, generates prompt message based on the parsed semantics, and then sends the prompt message to the GAILLM server 120. The GAILLM server 120 inputs the prompt message into the GAILLM to obtain a response outputted by the GAILLM, and sends the response to the prompt server 113. The response includes a task execution command, and prompt information of the information needs to be supplemented or confirmed. The prompt server 113 generates the second text (i.e., the response in text format shown in FIG. 8) for the response, and the second text includes the task execution command and the prompt information of the information needs to be supplemented or confirmed. The prompt server 113 sends the second text to the mobile APP. The mobile APP converts the prompt information in the second text into a synthesis speech in audio format through the text-to-speech server 140, and sends the synthesis speech to the smart glasses 111 for playback, so as to ask the user more information or acknowledgment to the user. At the same time, the mobile APP executes at least one action specified by the task execution command in the response.

Figure 9:
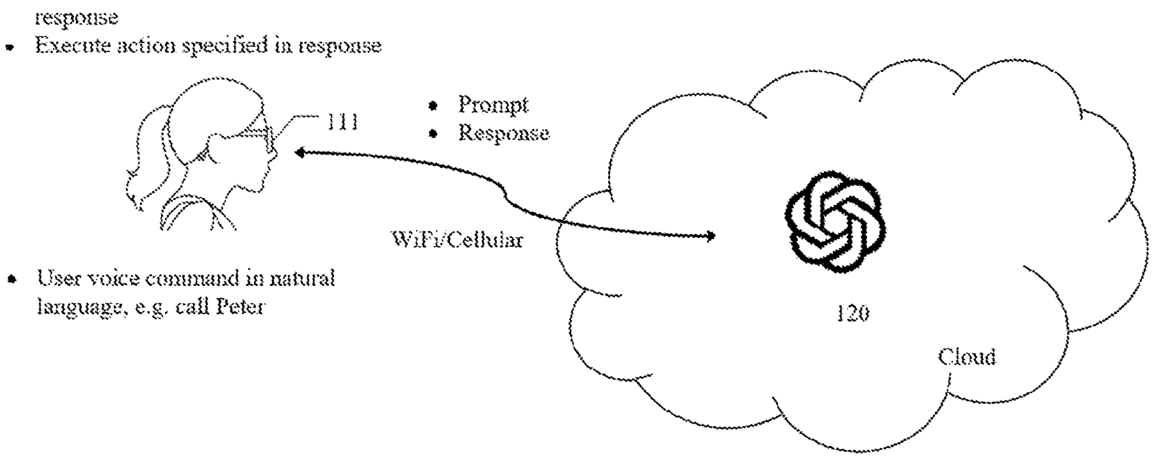
FIG. 9 is a schematic diagram of the sixth system framework based on the control system shown in FIGS. 1 and 3.

FIG. 9 is a schematic diagram of the sixth system framework based on the control system shown in FIGS. 1 and 3. As shown in FIG. 9, the control system includes: smart glasses 111, and a GAILLM server 120 in the cloud. the GAILLM is configured on the GAILLM server 120. The smartphone 112 is installed with a speech-to-text engine, a text-to-speech engine, and a mobile APP for wireless communication with the smart glasses 111 via the Bluetooth. The difference between the system framework shown in FIG. 9 and the system framework shown in FIG. 8 is that in the system framework shown in FIG. 9, the operations of speech-to-text, prompt message generation, and text-to-speech are all performed locally on the smartphone 112 by the mobile APP on the smartphone 112.

Figure 10:
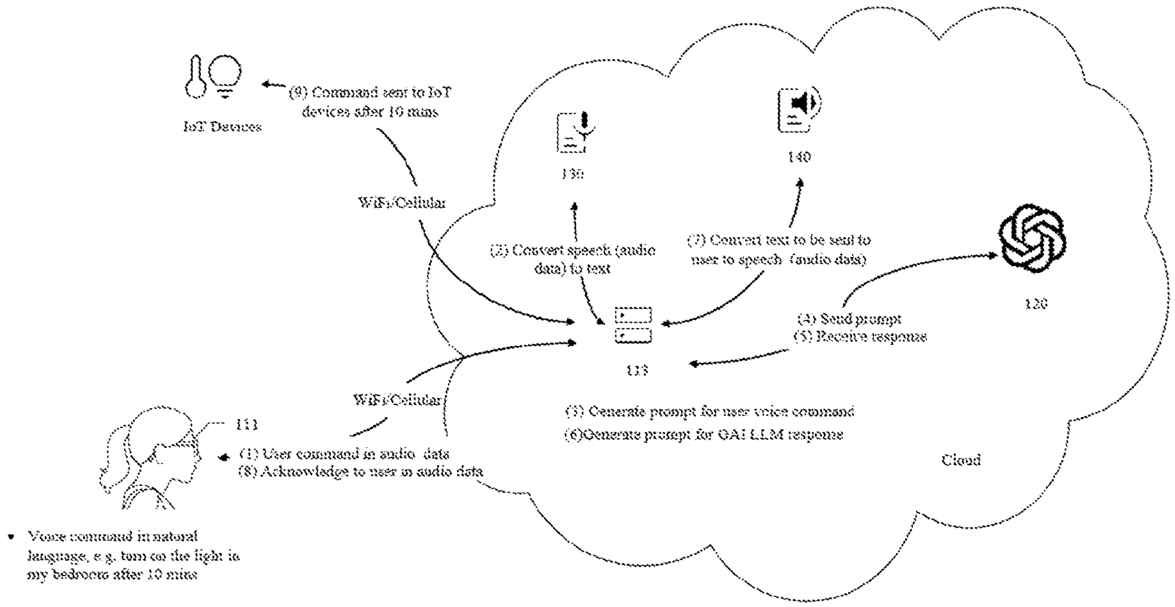
FIG. 10 is a schematic diagram of the seventh system framework based on the control system shown in FIGS. 1 and 3.

FIG. 10 is a schematic diagram of the seventh system framework based on the control system shown in FIGS. 1 and 3. As shown in FIG. 10, the control system includes: smart glasses 111, and a prompt server 113, a GAILLM server 120, a speech-to-text server 130 and a text-to-speech server 140 in the cloud. The GAILLM is configured on the GAILLM server 120. The smart glasses 111 communicate wirelessly with the prompt server 113 through WIFI or cellular network.

A voice command in natural language is spoken by a user wearing the smart glasses 111, for example, a user command in audio data format of "turn on the light in my bedroom after 10 minutes". The smart glasses 111 obtain the user command in audio data format, and send the user command in audio data format to the prompt server 113. The prompt server 113 converts the user command in audio data format into the first text through the speech-to-text server 130, and performs the semantic parsing on the first text, generates prompt message based on the parsed semantics, and then sends the prompt message to the GAILLM Server 120. The GAILLM server 120 inputs the prompt message into the GAILLM to obtain a response outputted by the GAILLM, and sends the response to the prompt server 113. The response includes a task execution command or prompt information of the information needs to be supplemented or confirmed.

For example, when there is only one light in the bedroom, the response includes a task execution command, so that the prompt server 113 executes the action of sending a command to the light in the bedroom (as the IoT device) through WIFI or cellular network after 10 minutes according to the task execution command, so as to control the light in the bedroom to turn on.

When there are a plurality of lamps in the bedroom, the response includes prompt information of asking the user to confirm or inquire which lamp to turn on. The prompt server 113 generates a text including prompt information for the response, converts the text into a synthesis speech in audio data format through the text-to-speech server 140, and sends the converted synthesis speech to the smart glasses 111 for playback, so as to confirm or inquire with the user which light in the bedroom needs to be turned on by the audio data manner. After the synthesis speech is played, the smart glasses 111 obtain a user speech in audio data format (for example, "turn on the bedside lamp in the bedroom") and send the user speech to the prompt server 113. The prompt server 113 converts the user speech in audio data format into a second text through the speech-to-text server 130, and performs the semantic parsing on the second text, generates prompt message based on the parsed semantics, and then sends the prompt message to the GAILLM server 120. The GAILLM server 120 inputs the prompt message into the GAILLM to obtain a response outputted by the GAILLM, and sends the response to the prompt server 113. The response includes a task execution command, and the prompt server 113 executes an action of sending a command to the bedside lamp (as the IoT device) through WIFI or cellular network after 10 minutes according to the task execution command to control the bedside lamp to turn on.

Figure 11:
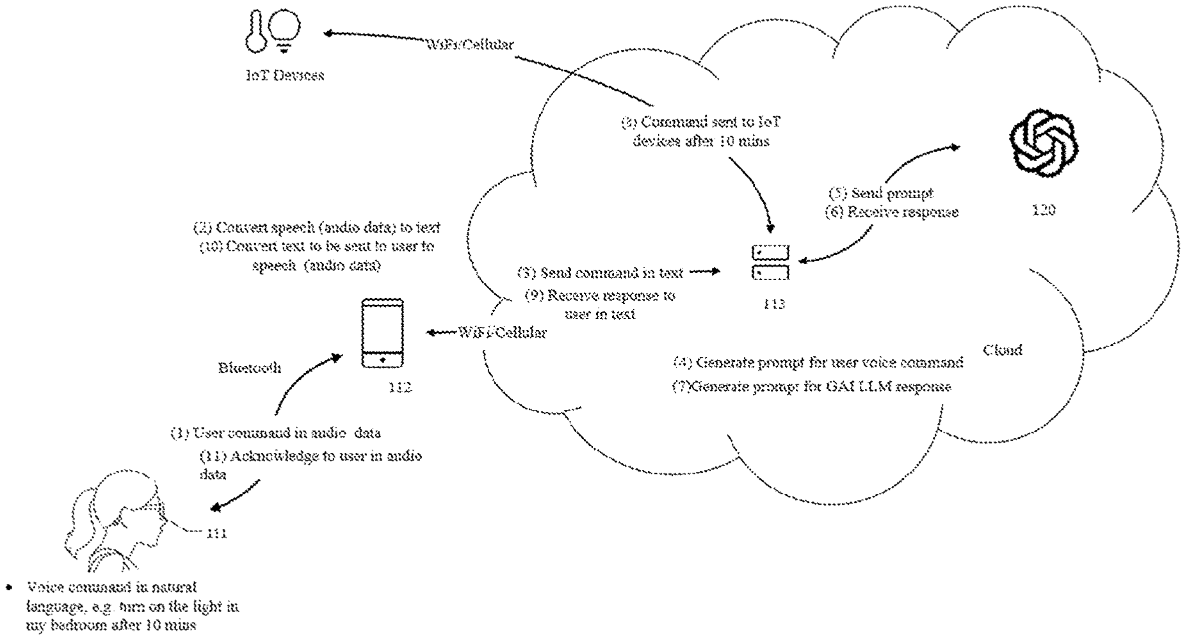
FIG. 11 is a schematic diagram of the eighth system framework based on the control system shown in FIGS. 1 and 3.

FIG. 11 is a schematic diagram of the eighth system framework based on the control system shown in FIGS. 1 and 3. As shown in FIG. 11, the control system includes: smart glasses 111, and a prompt server 113 and a GAILLM server 120 in the cloud. The GAILLM is configured on the GAILLM server 120. The smartphone 112 is installed with a mobile APP for wireless communication with the smart glasses 111 via the Bluetooth. The mobile APP further communicates wirelessly with the prompt server 113 through WIFI or cellular network.

A voice command in natural language is spoken by a user wearing the smart glasses 111, for example, a user command in audio data format of "turn on the light in my bedroom after 10 minutes". The smart glasses 111 obtain the user command in audio data format, and send the user command in audio data format to the smartphone 112. The smartphone 112 converts the user command in audio data format into a command in text, and sends the command in text to the prompt server 113. The prompt server 113 performs the semantic parsing on the command in text, generates prompt message according to the parsed semantics, and then sends the prompt message to the GAILLM server 120. The GAILLM server 120 inputs the prompt message into the GAILLM to obtain a response outputted by the GAILLM, and sends the response to the prompt server 113. The response includes a task execution command and prompt information of the information needs to be supplemented or confirmed. The prompt server 113 executes an action of sending a command to the light in the bedroom (as the IoT device) through WIFI or cellular network after 10 minutes according to the task execution command to control the light in the bedroom to turn on. At the same time, the prompt server 113 generates a response in text format for the response, and the response in text format will be sent to the user and includes the prompt information of the information needs to be supplemented or confirmed. The prompt server 113 sends the response in text format to the smartphone 112. The smartphone 112 converts the response in text format to be sent to the user into a synthesis speech, and sends the synthesis speech to the smart glasses 111. The smart glasses 111 play the synthesis speech, so as to ask the user more information or acknowledgment to the user by the audio data manner.

In the above-mentioned embodiments, the smart glasses system utilizes the GAILLM(s) to realize the device control based on the natural language voice command(s), thereby improving the convenience of the device control based on the smart glasses system, and due to the scalability and self-creativity of the GAILLM, the intelligence and interactivity of the smart glasses system are further improved.

Figure 12:
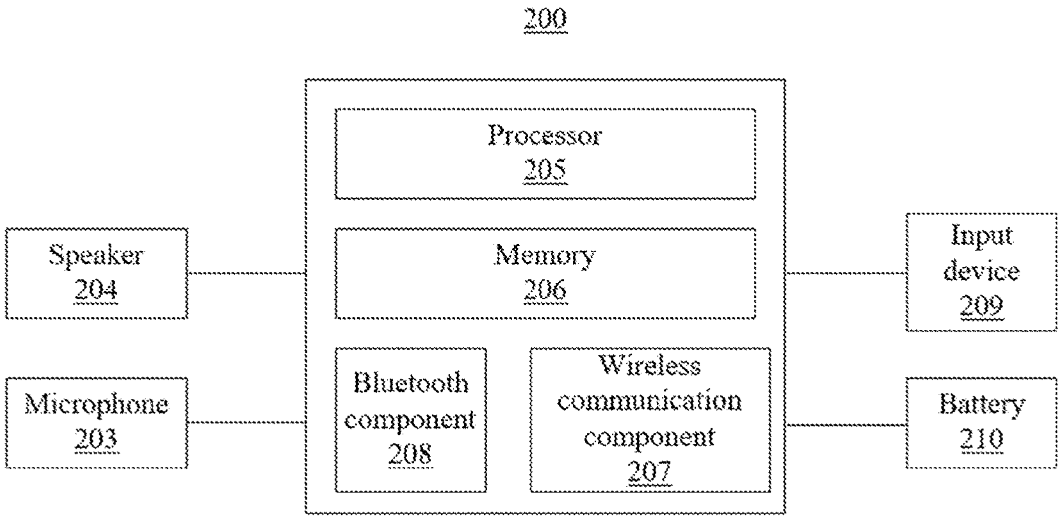
FIG. 12 is a schematic diagram of an internal structure of smart glasses according to one embodiment of the present disclosure.
Figure 13:
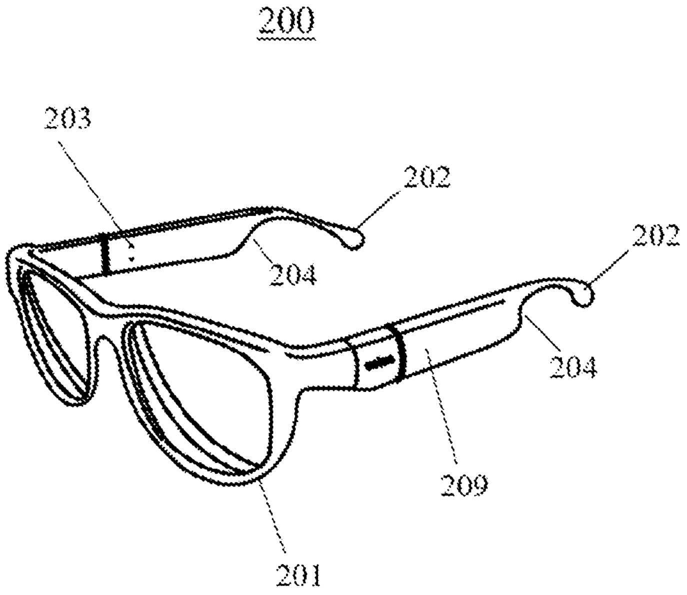
FIG. 13 is a schematic diagram of an external structure of the smart glasses according to one embodiment of the present disclosure.

FIG. 12 is a schematic diagram of an internal structural of smart glasses according to one embodiment of the present disclosure. FIG. 13 is a schematic diagram of an external structure of the smart glasses according to one embodiment of the present disclosure. For ease of description, only parts related to the embodiments of the present disclosure are shown in the figures. As shown in FIG. 12 and FIG. 13, smart glasses 200 include: a front frame 201, at least one temple 202, at least one microphone 203, at least one speaker 204, at least one processor 205 and at least one memory 206. FIG. 12 and FIG. 13 are only the best examples, and in practical applications, the smart glasses 200 may have fewer or more components than those shown in FIG. 12 and FIG. 13.

The front frame 201 may be, for example, a front frame with lenses (e.g., sunglasses lenses, clear lenses, or corrective lenses). The at least one temple 202 may include, for example, a left temple 202A and a right temple 202B.

The temple 202 is connected to the front frame 201, and the processor 205 is electrically connected to the microphone 203, the speaker 204 and the memory 205. The microphone 203, the speaker 204, the processor 205 and the memory 206 are arranged on at least one temple 202 and/or the front frame 201. Preferably, the at least one temple 202 is detachably connected to the frame 201.

The processor 205 includes an CPU (Central Processing Unit/Processor) and a DSP (Digital Signal Processing). The DSP is used to process the voice data obtained by the microphone 103. The CPU is preferably an MCU (Microcontroller Unit).

The memory 206 is a non-transitory memory, and specifically may include: a RAM (Random Access Memory) and a flash memory component. One or more programs executable by the processor 205 are stored in the memory 206, and the one or more programs include a plurality of instructions. The instructions are used to obtain the first user speech through the microphone 203, perform a semantic parsing on the first user speech, obtain at least one task execution command through the GAILLM based on the parsed semantics, and execute at least one action corresponding to the at least one task execution command. The GAILLM is configured on the smart glasses 200 or other devices, such as a smart mobile terminal or other cloud server. The instructions obtain the at least one task execution command by inputting the parsed semantics into the GAILLM on the smart glasses 200, or by sending the parsed semantics to other devices configured with the GAILLM.

Optionally, in other embodiments of the present disclosure, the GAILLM is configured on a model service (e.g., the GAILLM server 120 in the control system shown in FIG. 1), the one or more programs further include a speech-to-text engine, the smart glasses 200 further include a wireless communication component 207 electrically connected to the processor 205, and the instructions are further used to convert the first user speech into a first text through the speech-to-text engine; perform the semantic parsing on the first text, and generate at least one first prompt message based on the parsed semantics; send the at least one first prompt message to the model server through the wireless communication component 207, so as to obtain, through the GAILLM on the model server, the at least one task execution command based on the at least one first prompt message; and receive the at least one task execution command from the model server through the wireless communication component 207.

The wireless communication component 207 includes a wireless signal transceiver and peripheral circuits, which can be specifically arranged in the inner cavity of the front frame 201 and/or the at least one temple 202. The wireless signal transceiver may, but is not limited to, use at least one of the WIFI (Wireless Fidelity) protocol, the NFC (Near Field Communication) protocol, the ZigBee protocol, the UWB (Ultra-Wide Band) protocol, the RFID (Radio Frequency Identification) protocol, and the cellular mobile communication protocol (such as 3G/4G/5G, etc.) to perform the data transmission.

Optionally, in other embodiments of the present disclosure, the GAILLM is configured on a model service, the smart glasses 200 further include a wireless communication component 207 electrically connected to the processor 205, the instructions are further used to: send, through the wireless communication component 207, the first user speech to the model server, so as to convert, through the speech-to-text engine on the model server, the first user speech into a first text and perform the semantic parsing on the first text, and to obtain, through the GAILLM on the model server, the at least one task execution command based on the parsed semantics; and receive, through the wireless communication component 207, the at least one task execution command from the model server.

Optionally, the speech-to-text engine is configured on the model server or a speech-to-text server. The smart glasses 200 or the model server converts the first user speech into the first text by the data interaction with the speech-to-text server.

Optionally, in other embodiments of the present disclosure, the instructions are further used to: receive, through the wireless communication component 207, the task execution commands and execution order of each of the task execution commands from the model server; and execute actions corresponding to each of the task execution commands according to the execution order.

Optionally, in other embodiments of the present disclosure, the model server sends the task execution commands one by one to the smart glasses 200, and the instructions are further used to send a notification message to the model server after executing an action corresponding to one task execution command, so that the model server sends a next task execution command to the smart glasses 200 according to the notification message.

Optionally, in other embodiments of the present disclosure, the instructions are further used to: receive, through the wireless communication component 207, a speech including prompt information of information needs to be supplemented or confirmed from the model server, and play, through the speaker 204, the speech; and obtain, through the microphone 203, a second user speech, and send, through the wireless communication component 207, the second user speech to the model server, so that the model server obtains the at least one task execution command through the GAILLM based on the first user speech and the second user speech.

Optionally, in other embodiments of the present disclosure, the smart glasses 200 further include a wireless communication component 207 electrically connected to the processor 205, and the instructions are further used to send one or more control instructions to at least one device in an Internet of Things (IoT) according to the at least one task execution command through the wireless communication component 207, to control the at least one device to execute one or more actions specified by the at least one task execution command.

Optionally, in other embodiments of the present disclosure, the smart glasses 200 further include a wireless communication component 207 electrically connected to the processor 205, the GAILLM is configured on a model server, and the instructions are further used to send, through the wireless communication component 207, the first user speech to a prompt server, so that the prompt server converts the first user speech into a first text through a speech-to-text engine, performs the semantic parsing on the first text, generates at least one first prompt message based on the parsed semantics, and sends the at least one first prompt message to the model server. The model server obtains the at least one task execution command through the GAILLM based on the at least one first prompt message, and sends the at least one task execution command to the prompt server. The instructions are further used to receive, through the wireless communication component 207, the at least one task execution command sent by the prompt server.

Optionally, in other embodiments of the present disclosure, the smart glasses 200 further include a wireless communication component 207 electrically connected to the processor 205, the GAILLM is configured on a model server, and the instructions are further used to: send, through the wireless communication component 207, the first user speech to a prompt server, so that the prompt server converts the first user speech into a first text through a speech-to-text engine, performs the semantic parsing on the first text, and generates at least one first prompt message based on the parsed semantics; receive, through the wireless communication component 207, the at least one first prompt message sent by the prompt server, and send the at least one first prompt message to the model server, so that the model server obtains the at least one task execution command through the GAILLM based on the at least one first prompt message; and receive, through the wireless communication component 207, the at least one task execution command sent by the model server.

Optionally, in other embodiments of the present disclosure, the GAILLM is configured on the smart glasses 200 or the smart mobile terminal. The smart glasses 200 further include a Bluetooth component 208 electrically connected to the processor 205. The Bluetooth component 208 includes a Bluetooth signal transceiver and peripheral circuits, which can be specifically arranged in the inner cavity of the front frame 201 and/or the at least one temple 202. The Bluetooth component 208 can be connected to the smart mobile terminals such as smart phones or smart watches, and is used for phone call, music and data communication.

The instructions are further used to obtain the at least one task execution command through the GAILLM configured on the smart glasses 200 based on the parsed semantics.

The instructions are further used to perform data interaction with the smart mobile terminal through the Bluetooth component 208, so as to forward, through the smart mobile terminal, the at least one first prompt message to the model server, receive, through the smart mobile terminal, the at least one task execution command sent by the model server, and obtain, through the smart mobile terminal, the at least one task execution command.

Optionally, in other embodiments of the present disclosure, the smart glasses 200 further include input devices 209 electrically connected to the processor 205. The input devices 209 include a touch sensor and a key. The key may be a power-on button on the smart glasses 200.

Optionally, in other embodiments of the present disclosure, the smart glasses 200 further include an indicator light and/or a buzzer electrically connected to the processor 205, and the instructions are further used to output, through the indicator light and/or the buzzer, prompt information. The prompt information is used to indicate a state of the smart glasses 200, the state includes: a working state and an idle state. The working state includes: a starting speech pickup status, a speech pickup status, a completing speech pickup status, and a speech processing status. The indicator light may be an LED (Light Emitting Diode) light.

Optionally, in other embodiments of the present disclosure, the smart glasses 200 further include a data sensing component electrically connected to the processor 205, and the data sensing component includes at least one component of a position sensor, an inertial measurement unit (IMU) sensor, a temperature sensor, a proximity sensor, a humidity sensor, an electronic compass, a timer, a camera and a pedometer. The position sensor may be, but not limited to, the positioning component based on the GPS (Global Positioning System) or the Beidou satellite.

The instructions are further used to obtain the sensing data of the at least one component, and obtain, through the GAILLM, the at least one task execution command based on the sensing data and the parsed semantics.

Alternatively, the instructions are further used to obtain the sensing data of the at least one component, and send, through the wireless communication component 207, the sensing data of the at least one component and the at least one prompt message to the model server or the smart mobile terminal, so that the GAILLM on the model server or the smart mobile terminal obtains at least one task execution command according to the sensing data and the at least one prompt message. For example, assuming that the first user speech contains semantics of "remind me when I walk near the movie theater", when the user of the smart glasses 200 is about to arrive at the movie theater, the GAILLM obtains a task execution command based on the real-time positioning data sent by the smart glasses 200 and the first prompt information containing the semantics, and sends the task execution command to the smart glasses 200, so as to instruct the smart glasses 200 to play the prompt speech of "you have arrived near the movie theater".

Optionally, in other embodiments of the present disclosure, the smart glasses 200 further include a voice biometric recognition module, the voice biometric recognition module is used to identify the user using the acquired voice print of the user of the smart glasses 200, so as to enable the above-mentioned voice control function based on the smart glasses 200.

The smart glasses 200 further include a battery 210 for providing power to the above-mentioned electronic components (such as the microphone 203, the speaker 204, the processor 205, the memory 306, etc.) on the smart glasses 100.

The various electronic components of the above-mentioned smart glasses are connected through a bus.

It should be noted that, the relationship between the components of the above-mentioned smart glasses is a substitution relationship or a superposition relationship. That is, all the above-mentioned components in the embodiment are installed on the smart glasses, or some of the above-mentioned components selectively are installed according to requirements. When the relationship is an alternative relationship, the smart glasses are further provided with at least one of a peripheral connection interface, for example, a PS/2 interface, a serial interface, a parallel interface, an IEEE1394 interface, and a USB (Universal Serial Bus) interface. The function of the replaced component is realized through the peripheral device connected to the connection interface, and the peripheral device such as external speaker, external sensor, etc.

Figure 14:
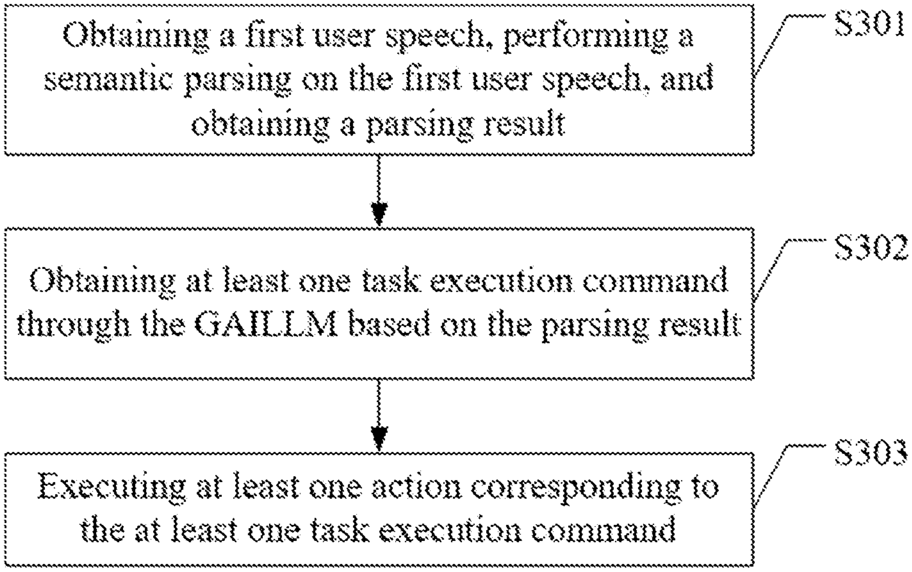
FIG. 14 is a flow diagram of a natural language command control method based on the GAILLM according to one embodiment of the present disclosure.
Figure 15:
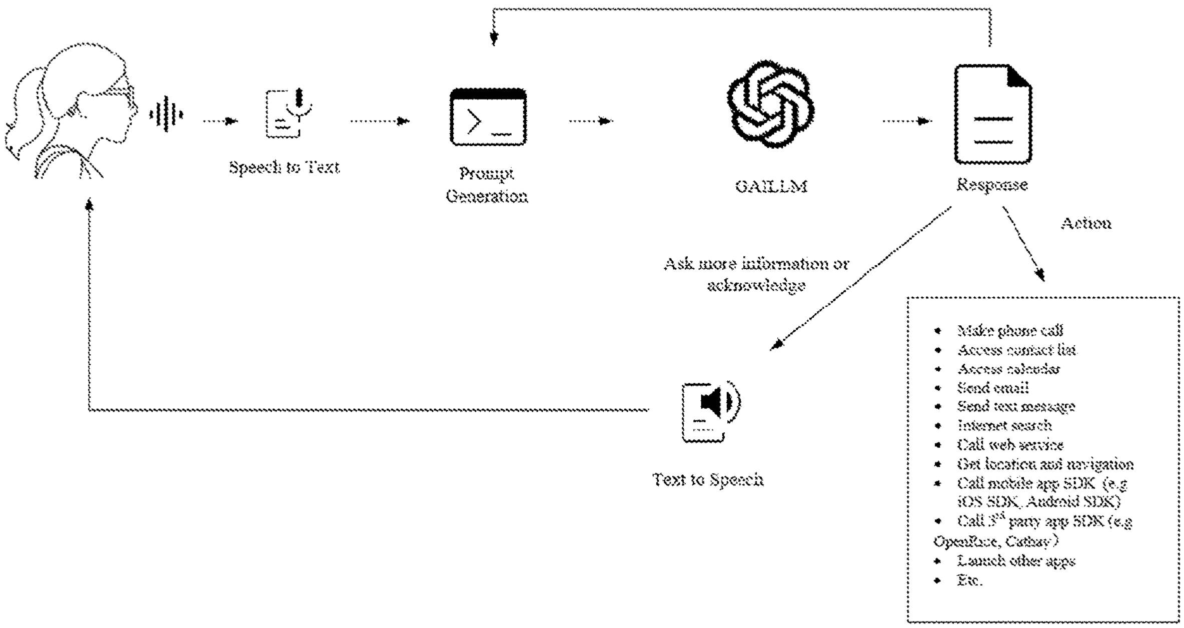
FIGS. 15 and 16 are schematic diagrams of working mechanism of the control method shown in FIG. 14.
Figure 16:
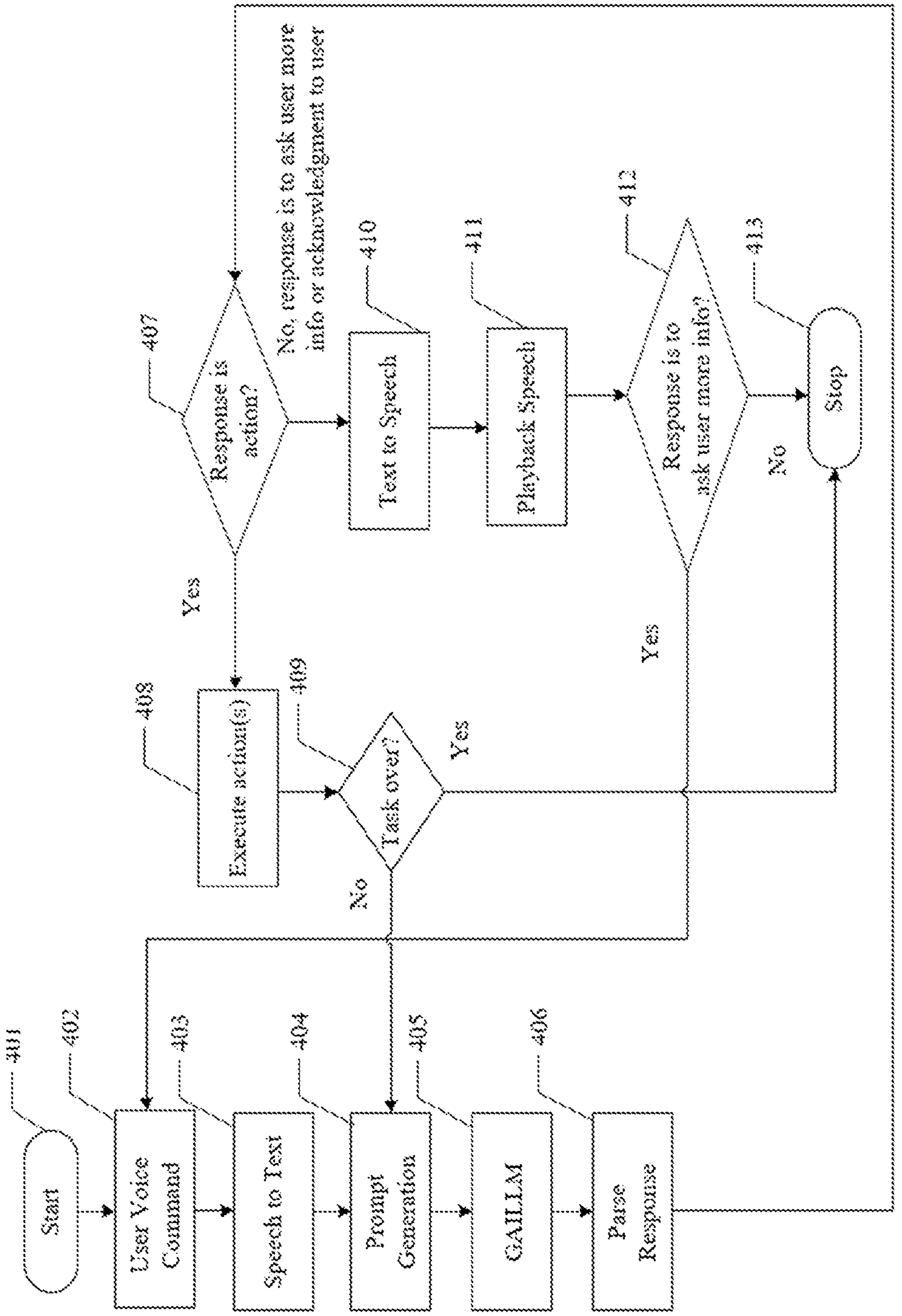

For details not covered in the embodiments about the smart glasses, reference may also be made to the relevant descriptions in the embodiments shown in the above-mentioned FIGS. 1 to 3 and the following FIGS. 14 to 16, which will not be repeated here.

In the above-mentioned embodiments, the smart glasses utilize the GAILLM(s) to realize the device control based on the natural language voice command(s), thereby improving the convenience of the device control based on the smart glasses system, and due to the scalability and self-creativity of the GAILLM, the intelligence and interactivity of the smart glasses system are further improved.

FIG. 14 is a flow diagram of a natural language command control method based on the GAILLM according to one embodiment of the present disclosure. The method can be applied to a smart wearable device system, such as the smart glasses system 110 in the embodiments shown in FIG. 1 and FIG. 3. The smart wearable device may include, but is not limited to: a smart helmet, a smart earphone, a smart earring, a smart watch, and smart glasses shown in FIG. 12 and FIG. 13. As shown in FIG. 14, the method includes the following steps:

- S301, obtaining a first user speech, performing a semantic parsing on the first user speech, and obtaining a parsing result;
- S302, obtaining at least one task execution command through the GAILLM based on the parsing result; and
- S303, executing at least one action corresponding to the at least one task execution command.

The GAILLM(s) can be configured on any device in the smart wearable device system, such as the smart glasses 111, the smart mobile terminal 112, or the prompt server 113 in the smart glasses system 110 shown in FIG. 3. Alternatively, the GAILLM(s) can further be configured on other cloud servers, such as the GAILLM server 120 shown in FIG. 1 and FIG. 3

Optionally, in other embodiments of the present disclosure, the smart wearable device system includes a smart wearable device and a smart mobile terminal, and the GAILLM is configured on a model server. The steps of obtaining the first user speech, performing the semantic parsing on the first user speech and obtaining the parsing result, obtaining the at least one task execution command through the GAILLM based on the parsing result, and executing the at least one action corresponding to the at least one task execution command include:

- obtaining, by the smart wearable device, the first user speech, converting the first user speech into a first text through a speech-to-text engine, performing the semantic parsing on the first text, generating at least one first prompt message based on the parsed semantics, and sending the at least one first prompt message to the smart mobile terminal through a Bluetooth;
- sending, by the smart mobile terminal, the at least one first prompt message to the model server, to obtain, through the GAILLM on the model server, the at least one task execution command based on the at least one first prompt message; and
- receiving, by the smart mobile terminal, the at least one task execution command from the model server, and executing the at least one action corresponding to the at least one task execution command.

Optionally, in other embodiments of the present disclosure, the smart wearable device system includes a smart wearable device and a smart mobile terminal, and the GAILLM is configured on a model server. The steps of obtaining the first user speech, performing the semantic parsing on the first user speech and obtaining the parsing result, obtaining the at least one task execution command through the GAILLM based on the parsing result, and executing the at least one action corresponding to the at least one task execution command include:

- obtaining, by the smart wearable device, the first user speech, and sending the first user speech to the smart mobile terminal through a Bluetooth;

converting, by the smart mobile terminal, the first user speech into a first text through a speech-to-text engine, performing the semantic parsing on the first text, generating at least one first prompt message based on the parsed semantics, and sending the at least one first prompt message to the model server, to obtain, through the GAILLM on the model server, the at least one task execution command based on the at least one first prompt message; and receiving, by the smart mobile terminal, the at least one task execution command from the model server, and executing the at least one action corresponding to the at least one task execution command.

Optionally, in other embodiments of the present disclosure, the smart wearable device system includes a smart wearable device and a smart mobile terminal, and the GAILLM is configured on the smart mobile terminal. The steps of obtaining the first user speech, performing the semantic parsing on the first user speech and obtaining the parsing result, obtaining the at least one task execution command through the GAILLM based on the parsing result, and executing the at least one action corresponding to the at least one task execution command include:

obtaining, by the smart wearable device, the first user speech, and sending the first user speech to the smart mobile terminal through a Bluetooth; and converting, by the smart mobile terminal, the first user speech into a first text through a speech-to-text engine, performing the semantic parsing on the first text and obtaining a parsing result, obtaining the at least one task execution command through the GAILLM based on the parsing result, and executing the at least one action corresponding to the at least one task execution command.

Optionally, in other embodiments of the present disclosure, the smart mobile terminal generates a plurality of first prompt messages based on the parsed semantics, and sends the first prompt messages and appearance order of semantics corresponding to each of the first prompt messages in the first text, to the model server. The model server obtains a plurality of task execution commands through the GAILLM based on the first prompt messages and the appearance order, and sends the task execution commands and execution order of each of the task execution commands to the smart mobile terminal. The execution order corresponds to the appearance order.

The step of receiving, by the smart mobile terminal, the at least one task execution command from the model server, and executing the at least one action corresponding to the at least one task execution command further includes:

receiving, by the smart mobile terminal, the task execution commands and the execution order of each of the task execution commands from the model server, and executing actions corresponding to each of the task execution commands according to the execution order.

Optionally, in other embodiments of the present disclosure, the smart mobile terminal generates a plurality of first prompt messages based on the parsed semantics, and sends the first prompt messages one by one to the model server.

Optionally, in other embodiments of the present disclosure, the model server determines whether there is information needs to be supplemented or confirmed through the GAILLM based on the at least one first prompt message. When there is no the information needs to be supplemented or confirmed, the model server obtains the at least one task execution command through the GAILLM based on the at least one first prompt message. When there is the information needs to be supplemented or confirmed, the model server generates a text including prompt information of the information needs to be supplemented or confirmed through the GAILLM, and sends the text to the smart mobile terminal.

The method further includes the following steps:

receiving, by the smart mobile terminal, the text sent by the model server, converting the text into a speech using a text-to-speech engine, and sending the speech to the smart wearable device;

playing, by the smart wearable device, the speech, obtaining a second user speech, and sending the second user speech to the smart mobile terminal through the Bluetooth; and converting, by the smart mobile terminal, the second user speech into a second text using the speech-to-text engine, performing a semantic parsing on the second text, generating a second prompt message based on the parsed semantics in the second text, and sending the second prompt message to the model server, so that the model server determines whether there is the information needs to be supplemented or confirmed through the GAILLM based on all received prompt messages, where when there is no the information needs to be supplemented or confirmed, the model server obtains the at least one task execution command through the GAILLM based on the all received prompt messages, and when there is the information needs to be supplemented or confirmed, the model server returns to the step of generating the text including the prompt information of the information needs to be supplemented or confirmed through the GAILLM, and sending the text to the smart mobile terminal.

Optionally, in other embodiments of the present disclosure, the steps of performing the semantic parsing on the first user speech and obtaining the parsing result, obtaining the at least one task execution command through the GAILLM based on the parsing result, and executing the at least one action corresponding to the at least one task execution command include:

performing, by the smart mobile terminal, the semantic parsing on the first user speech and obtaining a first parsing result, determining whether there is information needs to be supplemented or confirmed through the GAILLM based on the first parsing result;

when there is no the information needs to be supplemented or confirmed, obtaining, by the smart mobile terminal, the at least one task execution command through the GAILLM based on the first parsing result;

when there is the information needs to be supplemented or confirmed, generating, by the smart mobile terminal, a text including prompt information of the information needs to be supplemented or confirmed through the GAILLM, converting the text into a speech using a text-to-speech engine, and sending the speech to the smart wearable device through the Bluetooth;

playing, by the smart wearable device, the speech, obtaining a second user speech, and sending the second user speech to the smart mobile terminal through the Bluetooth;

converting, by the smart mobile terminal, the second user speech into a second text using a speech-to-text engine, performing a semantic parsing on the second user speech and obtaining a second parsing result, determining whether there is the information needs to be supplemented or confirmed through the GAILLM based on the first parsing result and the second parsing result;

when there is no the information needs to be supplemented or confirmed, obtaining, by the smart mobile terminal, the at least one task execution command through the GAILLM based on the first parsing result and the second parsing result; and when there is the information needs to be supplemented or confirmed, returning to the step of generating, by the smart mobile terminal, the text including the prompt information of the information needs to be supplemented or confirmed through the GAILLM.

Optionally, in other embodiments of the present disclosure, the smart wearable device system includes a smart wearable device and a prompt server. The steps of obtaining the first user speech, performing the semantic parsing on the first user speech and obtaining the parsing result, obtaining the at least one task execution command through the GAILLM based on the parsing result, and executing the at least one action corresponding to the at least one task execution command include:

obtaining, by the smart wearable device, the first user speech through a built-in microphone of the smart wearable device, and sending the first user speech to the prompt server;

sending, by the prompt server, the first user speech to a speech-to-text server, to convert the first user speech into a first text through the speech-to-text server;

performing, by the prompt server, the semantic parsing on the first text returned from the speech-to-text server, generating the at least one first prompt message based on the parsed semantics, and sending the at least one first prompt message to the model server, so that the model server determines whether there is information needs to be supplemented or confirmed through the GAILLM based on the at least one first prompt message, where when there is no the information needs to be supplemented or confirmed, the model server obtains the at least one task execution command through the GAILLM based on the at least one first prompt message, and sends the at least one task execution command to the prompt server, and when there is the information needs to be supplemented or confirmed, the model server obtains the at least one task execution command through the GAILLM based on the at least one first prompt message, and sends the at least one task execution command and prompt information of the information needs to be supplemented or confirmed to the prompt server;

sending, by the prompt server, one or more control instructions to at least one device in an Internet of Things (IoT) according to the at least one task execution command to control the at least one device to execute one or more actions specified by the at least one task execution command, generating a corresponding text according to the prompt information, and sending the corresponding text to a text-to-speech server to convert the corresponding text into a speech through the text-to-speech engine;

sending, by the prompt server, the speech returned from the text-to-speech engine to the smart wearable device; and playing, by the smart wearable device, the speech.

Optionally, in other embodiments of the present disclosure, the smart wearable device system includes a smart wearable device, a smart mobile terminal and a prompt server, the GAILLM is configured on the smart mobile terminal. The steps of obtaining the first user speech, performing the semantic parsing on the first user speech and obtaining the parsing result, obtaining the at least one task execution command through the GAILLM based on the parsing result, and executing the at least one action corresponding to the at least one task execution command include:

obtaining, by the smart wearable device, the first user speech, and sending the first user speech to the prompt server through a wireless network;

converting, by the prompt server, the first user speech into a first text using a speech-to-text engine, performing the semantic parsing on the first text, generating at least one first prompt message based on the parsed semantics, and sending the at least one first prompt message to the smart wearable device through the wireless network;

sending, by the smart wearable device, the at least one first prompt message to the smart mobile terminal through a Bluetooth; and obtaining, by the smart mobile terminal, the at least one task execution command through the GAILLM based on the at least one first prompt message, and executing the at least one action corresponding to the at least one task execution command.

Optionally, in other embodiments of the present disclosure, the smart wearable device system includes a smart wearable device, a smart mobile terminal and a prompt server, the GAILLM is configured on a model server. The steps of obtaining the first user speech, performing the semantic parsing on the first user speech and obtaining the parsing result, obtaining the at least one task execution command through the GAILLM based on the parsing result, and executing the at least one action corresponding to the at least one task execution command include:

obtaining, by the smart wearable device, the first user speech, and sending the first user speech to the prompt server through a wireless network;

converting, by the prompt server, the first user speech into a first text using a speech-to-text engine, performing the semantic parsing on the first text, generating at least one first prompt message based on the parsed semantics, and sending the at least one first prompt message to the smart wearable device through the wireless network;

sending, by the smart wearable device, the at least one first prompt message to the smart mobile terminal through a Bluetooth;

sending, by the smart mobile terminal, the at least one first prompt message to the model server, so that the model server obtains the at least one task execution command through the GAILLM based on the at least one first prompt message; and receiving, by the smart mobile terminal, the at least one task execution command sent by the model server, and executing the at least one action corresponding to the at least one task execution command.

Optionally, in other embodiments of the present disclosure, the smart wearable device system includes a smart wearable device, a smart mobile terminal and a prompt server, the GAILLM is configured on a model server. The steps of obtaining the first user speech, performing the semantic parsing on the first user speech and obtaining the parsing result, obtaining the at least one task execution command through the GAILLM based on the parsing result, and executing the at least one action corresponding to the at least one task execution command include:

obtaining, by the smart wearable device, the first user speech, and sending the first user speech to the prompt server through a wireless network;

converting, by the prompt server, the first user speech into a first text using a speech-to-text engine, performing the semantic parsing on the first text, generating at least one first prompt message based on the parsed semantics, and sending the at least one first prompt message to the smart wearable device through the wireless network;

sending, by the smart wearable device, the at least one first prompt message to the model server through the wireless network, so that the model server obtains the at least one task execution command through the GAILLM based on the at least one first prompt message; and receiving, by the smart wearable device, the at least one task execution command from the model server through the wireless network, and sending the at least one task execution command to the smart mobile terminal through a Bluetooth; and executing, by the smart mobile terminal, the at least one action corresponding to the at least one task execution command.

Hereinafter, the working mechanism of the above-mentioned control method will be described with reference to FIGS. 15 and 16. As shown in FIG. 15 and blocks 401 to 413 in FIG. 16, firstly, a user speech containing a user speech command will be converted into a text by a "speech-to-text" engine. The user speech in text format will be used to generate a prompt message for instructing the "the GAILLM" how to analyze and response to the user speech. The prompt message is generated based on the semantics parsed from the text. For example, the prompt message will indicate "the GAILLM" to answer what is the intention of the user speech. The GAILLM generates a response based on the prompt message.

As shown in FIG. 15, the response may be to instruct the smart glasses system to ask the user more information or acknowledgment to the user. Alternatively, the response may be to instruct the corresponding device to execute the action corresponding to the prompt message, such as: make phone call, access contact list, access calendar, send email, send text messages, Internet search, call web service, get location and navigation, call mobile application SDK (such as iOS SDK, Android SDK), call third-party application SDK (such as OpenRice, Cathay), launch other apps, etc. Alternatively, the response may be to instruct the corresponding device to perform the corresponding action and at the same time instruct the smart glasses system to ask the user more information or acknowledgment to the user.

As shown in blocks 404 and 413 in FIG. 16, when the response indicates to perform a corresponding action, the corresponding action is performed. When the response is to ask the user more information or acknowledgment to the user, the text including prompt information of the information needs to be supplemented or confirmed is converted into a speech, and the speech is played. When the answer not only indicates to perform the corresponding action but further indicates to ask the user more information or acknowledgment to the user, the corresponding action is performed, and then determine whether the response further indicates to ask the user more information or acknowledgment to the user, that is, determine whether the task is over? When the response further indicates to ask the user more information or acknowledgment to the user, indicating that the task is not over, return to block 404: generate a corresponding prompt speech and play the prompt speech.

Further, when the response indicates to ask the user more information, the user voice command is obtained again after the prompt speech is played, and so on until the end.

For example, if the user voice command is "I want to call Simon", the smart glasses system will generate the first prompt message to ask the GAILLM what is the intention of the user voice command. The response outputted by the GAILLM indicates that the intention is "call" and includes the first task execution command for obtain Simon's phone number. According to the first task execution command, the smart glasses system executes the action of obtaining Simon's phone number in the contact list of the smartphone and sends the execution result to the GAILLM. When there is only one Simon in the contact list, the GAILLM outputs the second task execution command, so that the smart glasses system makes a call according to Simon's phone number in the contact list. When there is no Simon in the contact list, the GAILLM outputs a response including the third task execution command and a prompt information of asking the user for Simon's phone number, so that the smart glasses system asks the user for Simon's phone number in the form of voice according to the response, and executes the action of making a call based on the phone number answered by the user according to the third task execution command. When there are a plurality of Simon on the phone of the contact, the GAILLM outputs a response including the fourth task execution command and prompt information of confirming which Simon the user needs to call, so that the smart glasses system confirms to the user which Simon needs to be called in the form of voice according to the response, and performs the call action based on the phone number confirmed by the user according to the fourth task execution command.

For details not covered in the embodiments about the control method, reference may further be made to the relevant descriptions in the above-mentioned embodiments shown in FIGS. 1 to 13, which will not be repeated here.

In the above-mentioned embodiments, the smart wearable device system utilizes the GAILLM(s) to realize the device control based on the natural language voice command(s), thereby improving the convenience of the device control based on the smart glasses system, and due to the scalability and self-creativity of the GAILLM, the intelligence and interactivity of the smart glasses system are further improved.

The present disclosure further provides a non-transitory computer-readable storage medium, which can be set in the smart glasses or smart wearable device in the above-mentioned embodiments, and may be the memory 206 in the embodiment shown in FIG. 12. The computer-readable storage medium stores one or more computer programs. When the one or more programs are executed by the processor, all or part of the natural language command control method based on the GAILLM, in the above-mentioned embodiment(s) is performed. Further, the computer-readable storage medium may also be a USB flash drive, a mobile hard disk, a read-only memory (ROM), a Random Access Memory (RAM), a disk, or a CD-ROM, or any medium capable of storing program code.

It should be understood that in the above-described embodiments of the present disclosure, the above-mentioned smart glasses, control system, and control method may be implemented in other manners. For example, multiple units/modules may be combined or be integrated into another system, or some of the features may be ignored or not performed. In addition, the above-mentioned mutual coupling/connection may be direct coupling/connection or communication connection, and may also be indirect coupling/connection or communication connection through some interfaces/devices, and may also be electrical, mechanical or in other forms.

It should be noted that for the various method embodiments described above, for the sake of simplicity, they are described as a series of action combinations. However, those skilled in the art should understand that the present disclosure is not limited by the order of the described actions, as certain steps can be performed in a different order or simultaneously. Additionally, it should be understood that the embodiments described in this invention are preferred embodiments, and the actions and modules involved are not necessarily required for the present disclosure.

In the above-mentioned embodiments, the descriptions of each embodiment have different focuses. For portions not described in a particular embodiment, reference can be made to relevant descriptions in other embodiments.

The above is a description of the smart glasses, control system, and control method provided by the present disclosure. Those skilled in the art should understand that based on the embodiments of the present disclosure, there may be changes in specific implementation methods and application scope. Therefore, the content of this specification should not be construed as limiting the present disclosure.

What is claimed is:

1. A natural language command control system based on generative artificial intelligence large language model (GAILLM), comprising: a smart glasses system and a model server, wherein:

the model server is configured with the GAILLM;

the smart glasses system is configured to obtain a first user speech, perform a semantic parsing on the first user speech, generate at least one first prompt message based on the parsed semantics, and send the at least one first prompt message to the model server;

the model server is configured to obtain at least one task execution command through the GAILLM based on the at least one first prompt message from the smart glasses system, and send the at least one task execution command to the smart glasses system, wherein the at least one task execution command comprises description information of each task and executor description information of each task, and wherein the GAILLM is trained with a large number of semantics and corresponding task execution commands as samples, the task execution command is configured to instruct an object to execute at least one target task, and one target task is associated with at least one corresponding action; and the smart glasses system is further configured to execute at least one action corresponding to the at least one task execution command;

wherein the smart glasses system is further configured to:

receive the at least one task execution command sent by the model server;

determine one or more executors of one or more tasks according to the executor description information of each task in the at least one task execution command; and distribute each task execution command to the determined one or more executors, so that each executor executes at least one action associated with the received task execution command, wherein the determined one or more executors comprise at least one of smart glasses, a smart mobile terminal, and devices in an Internet of Things (IoT); and wherein the smart glasses system is further configured to generate, through a prompt generator, the at least one first prompt message based on the parsed semantics, wherein the first prompt message comprises the parsed semantics, and wherein the prompt generator uses a plurality of associated semantics as one piece of prompt message according to a relationship between various semantics.

2. The control system of claim 1, wherein the smart glasses system comprises the smart glasses, and the smart mobile terminal and/or a prompt server, and the prompt generator is configured on the smart glasses, the smart mobile terminal, the model server, or the prompt server; and wherein the smart glasses are configured to obtain the first user speech through a built-in microphone, perform the semantic parsing on the first user speech, and generate, through the prompt generator, the at least one first prompt message based on the parsed semantics.

3. The control system of claim 2, wherein the smart glasses system comprises the smart glasses and the smart mobile terminal, and the prompt generator is configured on the smart mobile terminal; and wherein the smart glasses are further configured to send the first user speech to the smart mobile terminal through a Bluetooth;

the smart mobile terminal is configured to convert the first user speech into a first text through a speech-to-text engine, perform the semantic parsing on the first text, generate, through the prompt generator, the at least one first prompt message based on the parsed semantics, and send the at least one first prompt message to the model server;

the model server is configured to obtain the at least one task execution command through the GAILLM based on the at least one first prompt message from the smart mobile terminal, and send the at least one task execution command to the smart mobile terminal; and the smart mobile terminal is further configured to execute the at least one action corresponding to the at least one task execution command.

4. The control system of claim 3, wherein the smart mobile terminal is further configured to send, the first prompt messages, and appearance order of semantics corresponding to each of the first prompt messages in the first text, to the model server, or configured to send the first prompt messages to the model server one by one according to appearance order of semantics corresponding to each of the first prompt messages in the first text;

the model server is further configured to: obtain the task execution commands through the GAILLM based on the first prompt messages and the appearance order from the smart mobile terminal, and send, the task execution commands, and execution order of each of the task execution commands, to the smart mobile terminal, wherein the execution order corresponds to the appearance order; and the smart mobile terminal is further configured to execute actions corresponding to each of the task execution commands according to the execution order.

5. The control system of claim 3, wherein the model server is further configured to:

determine, through the GAILLM, whether there is information needs to be supplemented or confirmed based on the at least one first prompt message;

when there is no the information needs to be supplemented or confirmed, obtain, through the GAILLM, the at least one task execution command based on the at least one first prompt message;

when there is the information needs to be supplemented or confirmed, generate, through the GAILLM, a text comprising prompt information of the information needs to be supplemented or confirmed, and send the text to the smart mobile terminal;

receive a second prompt message from the smart mobile terminal, and determine, through the GAILLM, whether there is the information needs to be supplemented or confirmed based on all received prompt messages;

when there is no the information needs to be supplemented or confirmed, obtain, through the GAILLM, the at least one task execution command based on all received prompt messages; and when there is the information needs to be supplemented or confirmed, return to the step of generating, through the GAILLM, the text comprising the prompt information of the information needs to be supplemented or confirmed, and sending the text to the smart mobile terminal;

the smart mobile terminal is further configured to convert the text into a speech through a text-to-speech engine, and send the speech to the smart glasses;

the smart glasses are further configured to receive the speech through the Bluetooth, play the speech through a built-in speaker, obtain a second user speech through the microphone, and send the second user speech to the smart mobile terminal through the Bluetooth; and the smart mobile terminal is further configured to convert the second user speech into a second text using the speech-to-text engine, perform a semantic parsing on the second text, generate, through the prompt generator, the second prompt message based on the parsed semantics in the second text, and send the second prompt message to the model server.

6. The control system of claim 1, wherein the smart glasses system comprises the smart glasses and a prompt server, the prompt generator is configured on the prompt server, and the control system further comprises a speech-to-text server and a text-to-speech server; and wherein the smart glasses are configured to obtain the first user speech through a built-in microphone, and send the first user speech to the prompt server;

the prompt server is configured to send the first user speech to the speech-to-text server;

the speech-to-text server is configured to convert the first user speech into a first text, and send the first text to the prompt server;

the prompt server is further configured to perform the semantic parsing on the first text, generate, through the prompt generator, the at least one first prompt message based on the parsed semantics, and send the at least one first prompt message to the model server;

the model server is further configured to:

determine, through the GAILLM, whether there is information needs to be supplemented or confirmed based on the at least one first prompt message;

when there is no the information needs to be supplemented or confirmed, obtain, through the GAILLM, the at least one task execution command based on the at least one first prompt message, and send the at least one task execution command to the prompt server; and when there is the information needs to be supplemented or confirmed, obtain, through the GAILLM, the at least one task execution command based on the at least one first prompt message, and send, the at least one task execution command, and prompt information of the information needs to be supplemented or confirmed, to the prompt server;

the prompt server is further configured to send one or more control instructions to at least one device in the IoT according to the at least one task execution command to control the at least one device to execute one or more actions specified by the at least one task execution command, generate a corresponding text according to the prompt information, and send the corresponding text to the text-to-speech server;

the text-to-speech server is configured to convert the corresponding text into a speech, and send the speech to the prompt server;

the prompt server is further configured to send the speech to the smart glasses; and the smart glasses are further configured to play the speech through a built-in speaker.

7. The control system of claim 1, wherein the smart glasses system comprises the smart glasses, the smart mobile terminal and a prompt server, and the prompt generator is configured on the prompt server; and wherein the smart glasses are configured to obtain the first user speech by a built-in microphone, and send the first user speech to the smart mobile terminal;

the smart mobile terminal is configured to convert the first user speech into a first text, and send the first text to the prompt server;

the prompt server is configured to perform the semantic parsing on the first text, generate, through the prompt generator, the at least one first prompt message based on the parsed semantics, and send the at least one first prompt message to the model server;

the model server is further configured to:

determine, through the GAILLM, whether there is information needs to be supplemented or confirmed based on the at least one first prompt message;

when there is no the information needs to be supplemented or confirmed, obtain, through the GAILLM, the at least one task execution command based on the at least one first prompt message, and send the at least one task execution command to the prompt server; and when there is the information needs to be supplemented or confirmed, obtain, through the GAILLM, the at least one task execution command based on the at least one first prompt message, and send, the at least one task execution command, and prompt information of the information needs to be supplemented or confirmed to the prompt server;

the prompt server is further configured to send one or more control instructions to at least one device in an IoT according to the at least one task execution command to control the at least one device to execute one or more actions specified by the at least one task execution command, generate a corresponding text according to the prompt information, and send the corresponding text to the smart mobile terminal;

the smart mobile terminal is further configured to convert the corresponding text into a speech, and send the speech to the smart glasses; and the smart glasses are further configured to play the speech through a built-in speaker.

8. The control system of claim 1, wherein the smart glasses system comprises the smart glasses and the smart mobile terminal, the control system further comprises a prompt server, the prompt server is configured with a speech-to-text engine and the prompt generator, and the smart mobile terminal is configured with a text-to-speech engine; and wherein the smart glasses are configured to obtain the first user speech by a built-in microphone, and send the first user speech to the prompt server through a wireless network;

the prompt server is configured to convert the first user speech into a first text through the speech-to-text engine, perform the semantic parsing on the first text, generate, through the prompt generator, the at least one first prompt message based on the parsed semantics, and send the at least one first prompt message to the smart mobile terminal;

the smart mobile terminal is configured to send the at least one first prompt message to the model server;

the model server is further configured to:

determine, through the GAILLM, whether there is information needs to be supplemented or confirmed based on the at least one first prompt message;

when there is no the information needs to be supplemented or confirmed, obtain, through the GAILLM, the at least one task execution command based on the at least one first prompt message, and send the at least one task execution command to the smart mobile terminal; and when there is the information needs to be supplemented or confirmed, obtain, through the GAILLM, the at least one task execution command based on the at least one first prompt message, and send, the at least one task execution command, and prompt information of the information needs to be supplemented or confirmed, to the smart mobile terminal;

the smart mobile terminal is further configured to execute the at least one action corresponding to the at least one task execution command;

the smart mobile terminal is further configured to generate a corresponding text according to the prompt information, convert the corresponding text into a speech through the text-to-speech engine, and send the speech to the smart glasses; and the smart glasses are further configured to play the speech through a built-in speaker.

9. The control system of claim 1, wherein the smart glasses system comprises the smart glasses and the smart mobile terminal, and the smart mobile terminal is configured with the GAILLM; and wherein the smart glasses are configured to obtain the first user speech through a built-in microphone, and send the first user speech to the smart mobile terminal through a Bluetooth;

the smart mobile terminal is configured to convert the first user speech into a first text through a speech-to-text engine, perform the semantic parsing on the first text, obtain the at least one task execution command through the GAILLM based on the parsed semantics, and execute the at least one action corresponding to the at least one task execution command;

the smart mobile terminal is further configured to:

determine, through the GAILLM, whether there is information needs to be supplemented or confirmed based on the parsed semantics;

when there is no the information needs to be supplemented or confirmed, obtain, through the GAILLM, the at least one task execution command based on the parsed semantics; and when there is the information needs to be supplemented or confirmed, generate, through the GAILLM, a text comprising prompt information of the information needs to be supplemented or confirmed, convert the text into a speech through a text-to-speech engine, and send the speech to the smart glasses;

the smart glasses are further configured to receive the speech through the Bluetooth, play the speech through a built-in speaker, obtain a second user speech through the built-in microphone, and send the second user speech to the smart mobile terminal through the Bluetooth; and the smart mobile terminal is further configured to:

convert the second user speech into a second text through the speech-to-text engine, perform a semantic parsing on the second text, and determine, through the GAILLM, whether there is the information needs to be supplemented or confirmed based on the parsed semantics in the second text, when there is no the information needs to be supplemented or confirmed, obtain, through the GAILLM, the at least one task execution command based on all parsed semantics; and when there is the information needs to be supplemented or confirmed, return to the step of generating, through the GAILLM, the text comprising the prompt information of the information needs to be supplemented or confirmed.

10. A computer-implemented natural language command control method based on generative artificial intelligence large language model (GAILLM), applied to a smart wearable device system, comprising:

obtaining a first user speech, performing a semantic parsing on the first user speech, and obtaining a parsing result;

obtaining at least one task execution command through the GAILLM based on the parsing result, wherein the at least one task execution command comprises description information of each task and executor description information of each task, and wherein the GAILLM is trained with a large number of semantics and corresponding task execution commands as samples, the task execution command is configured to instruct an object to execute at least one target task, and one target task is associated with at least one corresponding action; and executing at least one action corresponding to the at least one task execution command;

wherein the step of obtaining the at least one task execution command through the GAILLM based on the parsing result comprises:

generating, through a prompt generator, at least one first prompt message based on the parsing result, wherein the first prompt message comprises the parsed semantics, wherein the prompt generator uses a plurality of associated semantics as one piece of prompt message according to a relationship between various semantics in the parsing result; and obtaining the at least one task execution command through the GAILLM based on the at least one first prompt message; and wherein the step of executing the at least one action corresponding to the at least one task execution command comprises:

determine one or more executors of one or more tasks according to the executor description information of each task in the at least one task execution command; and distribute each task execution command to the determined one or more executors, so that each executor executes at least one action associated with the received task execution command, wherein the determined one or more executors comprise at least one of a smart wearable device, a smart mobile terminal, and devices in an Internet of Things (IoT).

11. The control method of claim 10, wherein the smart wearable device system comprises the smart wearable device and the smart mobile terminal, the prompt generator is configured on the smart wearable device, the GAILLM is configured on a model server, and the steps of obtaining the first user speech, performing the semantic parsing on the first user speech and obtaining the parsing result, obtaining the at least one task execution command through the GAILLM based on the parsing result, and executing the at least one action corresponding to the at least one task execution command comprise:

obtaining, by the smart wearable device, the first user speech, converting the first user speech into a first text through a speech-to-text engine, performing the semantic parsing on the first text, generating the at least one first prompt message based on the parsed semantics using the prompt generator, and sending the at least one first prompt message to the smart mobile terminal through a Bluetooth;

sending, by the smart mobile terminal, the at least one first prompt message to the model server, to obtain, through the GAILLM on the model server, the at least one task execution command based on the at least one first prompt message; and receiving, by the smart mobile terminal, the at least one task execution command from the model server, and executing the at least one action corresponding to the at least one task execution command.

12. The control method of claim 10, wherein the smart wearable device system comprises the smart wearable device and the smart mobile terminal, the prompt generator is configured on the smart mobile terminal, the GAILLM is configured on a model server, and the steps of obtaining the first user speech, performing the semantic parsing on the first user speech and obtaining the parsing result, obtaining the at least one task execution command through the GAILLM based on the parsing result, and executing the at least one action corresponding to the at least one task execution command comprise:

obtaining, by the smart wearable device, the first user speech, and sending the first user speech to the smart mobile terminal through a Bluetooth;

converting, by the smart mobile terminal, the first user speech into a first text through a speech-to-text engine, performing the semantic parsing on the first text, generating the at least one first prompt message based on the parsed semantics using the prompt generator, and sending the at least one first prompt message to the model server, to obtain, through the GAILLM on the model server, the at least one task execution command based on the at least one first prompt message; and receiving, by the smart mobile terminal, the at least one task execution command from the model server, and executing the at least one action corresponding to the at least one task execution command.

13. The control method of claim 12, wherein the smart mobile terminal generates the first prompt messages based on the parsed semantics using the prompt generator, and sends, the first prompt messages, and appearance order of semantics corresponding to each of the first prompt messages in the first text, to the model server;

the model server obtains the task execution commands through the GAILLM based on the first prompt messages and the appearance order, and sends, the task execution commands, and execution order of each of the task execution commands, to the smart mobile terminal, wherein the execution order corresponds to the appearance order; and the step of receiving, by the smart mobile terminal, the at least one task execution command from the model server, and executing the at least one action corresponding to the at least one task execution command further comprises:

receiving, by the smart mobile terminal, the task execution commands and the execution order of each of the task execution commands from the model server, and executing actions corresponding to each of the task execution commands according to the execution order.

14. The control method of claim 12, wherein the smart mobile terminal generates the first prompt messages based on the parsed semantics using the prompt generator, and sends the first prompt messages one by one to the model server.

15. The control method of claim 12, wherein the model server determines whether there is information needs to be supplemented or confirmed through the GAILLM based on the at least one first prompt message; when there is no the information needs to be supplemented or confirmed, the model server obtains the at least one task execution command through the GAILLM based on the at least one first prompt message; and when there is the information needs to be supplemented or confirmed, the model server generates a text comprising prompt information of the information needs to be supplemented or confirmed through the GAILLM, and sends the text to the smart mobile terminal; and wherein the method further comprises:

receiving, by the smart mobile terminal, the text from the model server, converting the text into a speech using a text-to-speech engine, and sending the speech to the smart wearable device;

playing, by the smart wearable device, the speech, obtaining a second user speech, and sending the second user speech to the smart mobile terminal through the Bluetooth; and converting, by the smart mobile terminal, the second user speech into a second text using the speech-to-text engine, performing a semantic parsing on the second text, generating a second prompt message based on the parsed semantics in the second text by using the prompt generator, and sending the second prompt message to the model server, so that the model server determines whether there is the information needs to be supplemented or confirmed through the GAILLM based on all received prompt messages;

wherein when there is no the information needs to be supplemented or confirmed, the model server obtains the at least one task execution command through the GAILLM based on the all received prompt messages; and wherein when there is the information needs to be supplemented or confirmed, the model server returns to the step of generating the text comprising the prompt information of the information needs to be supplemented or confirmed through the GAILLM, and sending the text to the smart mobile terminal.

16. The control method of claim 10, wherein the smart wearable device system comprises the smart wearable device and the smart mobile terminal, the GAILLM is configured on the smart mobile terminal, and the steps of obtaining the first user speech, performing the semantic parsing on the first user speech and obtaining the parsing result, obtaining the at least one task execution command through the GAILLM based on the parsing result, and executing the at least one action corresponding to the at least one task execution command comprise:

obtaining, by the smart wearable device, the first user speech, and sending the first user speech to the smart mobile terminal through a Bluetooth; and converting, by the smart mobile terminal, the first user speech into a first text through a speech-to-text engine, performing the semantic parsing on the first text and obtaining a parsing result, obtaining the at least one task execution command through the GAILLM based on the parsing result, and executing the at least one action corresponding to the at least one task execution command.

17. The control method of claim 16, wherein the steps of performing the semantic parsing on the first user speech and obtaining the parsing result, obtaining the at least one task execution command through the GAILLM based on the parsing result, and executing the at least one action corresponding to the at least one task execution command comprise:

performing, by the smart mobile terminal, the semantic parsing on the first user speech and obtaining a first parsing result, determining whether there is information needs to be supplemented or confirmed through the GAILLM based on the first parsing result;

when there is no the information needs to be supplemented or confirmed, obtaining, by the smart mobile terminal, the at least one task execution command through the GAILLM based on the first parsing result;

when there is the information needs to be supplemented or confirmed, generating, by the smart mobile terminal, a text comprising prompt information of the information needs to be supplemented or confirmed through the GAILLM, converting the text into a speech using a text-to-speech engine, and sending the speech to the smart wearable device through the Bluetooth;

playing, by the smart wearable device, the speech, obtaining a second user speech, and sending the second user speech to the smart mobile terminal through the Bluetooth;

converting, by the smart mobile terminal, the second user speech into a second text using a speech-to-text engine, performing a semantic parsing on the second user speech and obtaining a second parsing result, determining whether there is the information needs to be supplemented or confirmed through the GAILLM based on the first parsing result and the second parsing result;

when there is no the information needs to be supplemented or confirmed, obtaining, by the smart mobile terminal, the at least one task execution command through the GAILLM based on the first parsing result and the second parsing result; and when there is the information needs to be supplemented or confirmed, returning to the step of generating, by the smart mobile terminal, the text comprising the prompt information of the information needs to be supplemented or confirmed through the GAILLM.

18. The control method of claim 10, wherein the smart wearable device system comprises the smart wearable device and a prompt server, the prompt generator is configured on the prompt server, and the steps of obtaining the first user speech, performing the semantic parsing on the first user speech and obtaining the parsing result, obtaining the at least one task execution command through the GAILLM based on the parsing result, and executing the at least one action corresponding to the at least one task execution command comprise:

obtaining, by the smart wearable device, the first user speech through a built-in microphone of the smart wearable device, and sending the first user speech to the prompt server;

sending, by the prompt server, the first user speech to a speech-to-text server, to convert the first user speech into a first text through the speech-to-text server;

performing, by the prompt server, the semantic parsing on the first text from the speech-to-text server, generating the at least one first prompt message based on the parsed semantics using the prompt generator, and sending the at least one first prompt message to the model server, so that the model server determines whether there is information needs to be supplemented or confirmed through the GAILLM based on the at least one first prompt message, wherein when there is no the information needs to be supplemented or confirmed, the model server obtains the at least one task execution command through the GAILLM based on the at least one first prompt message, and sends the at least one task execution command to the prompt server, and wherein when there is the information needs to be supplemented or confirmed, the model server obtains the at least one task execution command through the GAILLM based on the at least one first prompt message, and sends the at least one task execution command and prompt information of the information needs to be supplemented or confirmed to the prompt server;

sending, by the prompt server, one or more control instructions to at least one device in the IoT according to the at least one task execution command to control the at least one device to execute one or more actions specified by the at least one task execution command, generating a corresponding text according to the prompt information, and sending the corresponding text to a text-to-speech server to convert the corresponding text into a speech through the text-to-speech engine;

sending, by the prompt server, the speech returned from the text-to-speech engine to the smart wearable device; and playing, by the smart wearable device, the speech.

19. The control method of claim 10, wherein the smart wearable device system comprises the smart wearable device, the smart mobile terminal and a prompt server, the prompt generator is configured on the prompt server, the GAILLM is configured on the smart mobile terminal, and the steps of obtaining the first user speech, performing the semantic parsing on the first user speech and obtaining the parsing result, obtaining the at least one task execution command through the GAILLM based on the parsing result, and executing the at least one action corresponding to the at least one task execution command comprise:

obtaining, by the smart wearable device, the first user speech, and sending the first user speech to the prompt server through a wireless network;

converting, by the prompt server, the first user speech into a first text using a speech-to-text engine, performing the semantic parsing on the first text, generating the at least one first prompt message based on the parsed semantics using the prompt generator, and sending the at least one first prompt message to the smart wearable device through the wireless network;

sending, by the smart wearable device, the at least one first prompt message to the smart mobile terminal through a Bluetooth; and obtaining, by the smart mobile terminal, the at least one task execution command through the GAILLM based on the at least one first prompt message, and executing the at least one action corresponding to the at least one task execution command.

20. The control method of claim 10, wherein the smart wearable device system comprises the smart wearable device, the smart mobile terminal and a prompt server, the prompt generator is configured on the prompt server, the GAILLM is configured on a model server, and the steps of obtaining the first user speech, performing the semantic parsing on the first user speech and obtaining the parsing result, obtaining the at least one task execution command through the GAILLM based on the parsing result, and executing the at least one action corresponding to the at least one task execution command comprise:

obtaining, by the smart wearable device, the first user speech, and sending the first user speech to the prompt server through a wireless network;

converting, by the prompt server, the first user speech into a first text using a speech-to-text engine, performing the semantic parsing on the first text, generating the at least one first prompt message based on the parsed semantics using the prompt generator, and sending the at least one first prompt message to the smart wearable device through the wireless network;

sending, by the smart wearable device, the at least one first prompt message to the smart mobile terminal through a Bluetooth;

sending, by the smart mobile terminal, the at least one first prompt message to the model server, so that the model server obtains the at least one task execution command through the GAILLM based on the at least one first prompt message; and receiving, by the smart mobile terminal, the at least one task execution command from the model server, and executing the at least one action corresponding to the at least one task execution command.

21. The control method of claim 10, wherein the smart wearable device system comprises the smart wearable device, the smart mobile terminal and a prompt server, the prompt generator is configured on the prompt server, the GAILLM is configured on a model server, and the steps of obtaining the first user speech, performing the semantic parsing on the first user speech and obtaining the parsing result, obtaining the at least one task execution command through the GAILLM based on the parsing result, and executing the at least one action corresponding to the at least one task execution command comprise:

obtaining, by the smart wearable device, the first user speech, and sending the first user speech to the prompt server through a wireless network;

converting, by the prompt server, the first user speech into a first text using a speech-to-text engine, performing the semantic parsing on the first text, generating the at least one first prompt message based on the parsed semantics using the prompt generator, and sending the at least one first prompt message to the smart wearable device through the wireless network;

sending, by the smart wearable device, the at least one first prompt message to the model server through the wireless network, so that the model server obtains the at least one task execution command through the GAILLM based on the at least one first prompt message;

receiving, by the smart wearable device, the at least one task execution command from the model server through the wireless network, and sending the at least one task execution command to the smart mobile terminal through a Bluetooth; and executing, by the smart mobile terminal, the at least one action corresponding to the at least one task execution command.

* * * * *